United States Patent
Takeda et al.

[11] Patent Number: 6,151,158
[45] Date of Patent: Nov. 21, 2000

[54] METHOD AND DEVICE FOR OPTICAL AMPLIFICATION AND SYSTEM HAVING THE DEVICE

[75] Inventors: Miki Takeda; Susumu Kinoshita; Hiroshi Onaka, all of Kawasaki, Japan

[73] Assignee: Fujitsu Limited, Kawasaki, Japan

[21] Appl. No.: 09/001,092

[22] Filed: Dec. 30, 1997

[30] Foreign Application Priority Data

Aug. 11, 1997 [JP] Japan .................................. 9-216049

[51] Int. Cl.[7] ...................................................... H01S 3/00
[52] U.S. Cl. ........................................ 359/341; 359/124
[58] Field of Search ..................................... 359/341, 124

[56] References Cited

U.S. PATENT DOCUMENTS

| | | | |
|---|---|---|---|
| 5,311,606 | 5/1994 | Asakura et al. | 385/33 |
| 5,436,760 | 7/1995 | Nakabayashi | 359/341 |
| 5,583,689 | 12/1996 | Cassidy et al. | 359/341 |
| 5,706,125 | 1/1998 | Nakano | 359/341 |
| 5,875,054 | 2/1999 | Onoda et al. | 359/341 |
| 5,880,874 | 3/1999 | Shibuya et al. | 359/337 |
| 5,900,970 | 5/1999 | Kakui | 359/341 |
| 5,912,750 | 6/1999 | Takeda et al. | 359/124 |
| 5,914,795 | 6/1999 | Jourdan et al. | 359/134 |

FOREIGN PATENT DOCUMENTS

| | | |
|---|---|---|
| 3-44206 | 2/1991 | Japan . |
| 8-213676 | 8/1996 | Japan . |

*Primary Examiner*—Mark Hellner
*Attorney, Agent, or Firm*—Staas & Halsey, LLP

[57] ABSTRACT

A device comprising an optical amplifier including an optical amplifying medium, and first and second optical filters operatively connected to the optical amplifier to suppress the wavelength dependence of gain. The medium has an input end and an output end for an optical signal. The medium is pumped so that it provides a gain band. The gain band includes a first band giving a relatively high gain and noise figure to the optical signal and a second band giving a relatively low gain and noise figure to the optical signal. The first optical filter is connected to the input end of the medium and has characteristics such that the first optical filter suppresses the wavelength dependence of gain in the second band. The second optical filter is connected to the output end of the medium and has characteristics such that the second optical filter suppresses the wavelength dependence of gain in the first band. This configuration allows suitable suppression of the wavelength dependence of gain in each optical filter, thereby providing a low noise figure and high optical output power.

41 Claims, 17 Drawing Sheets

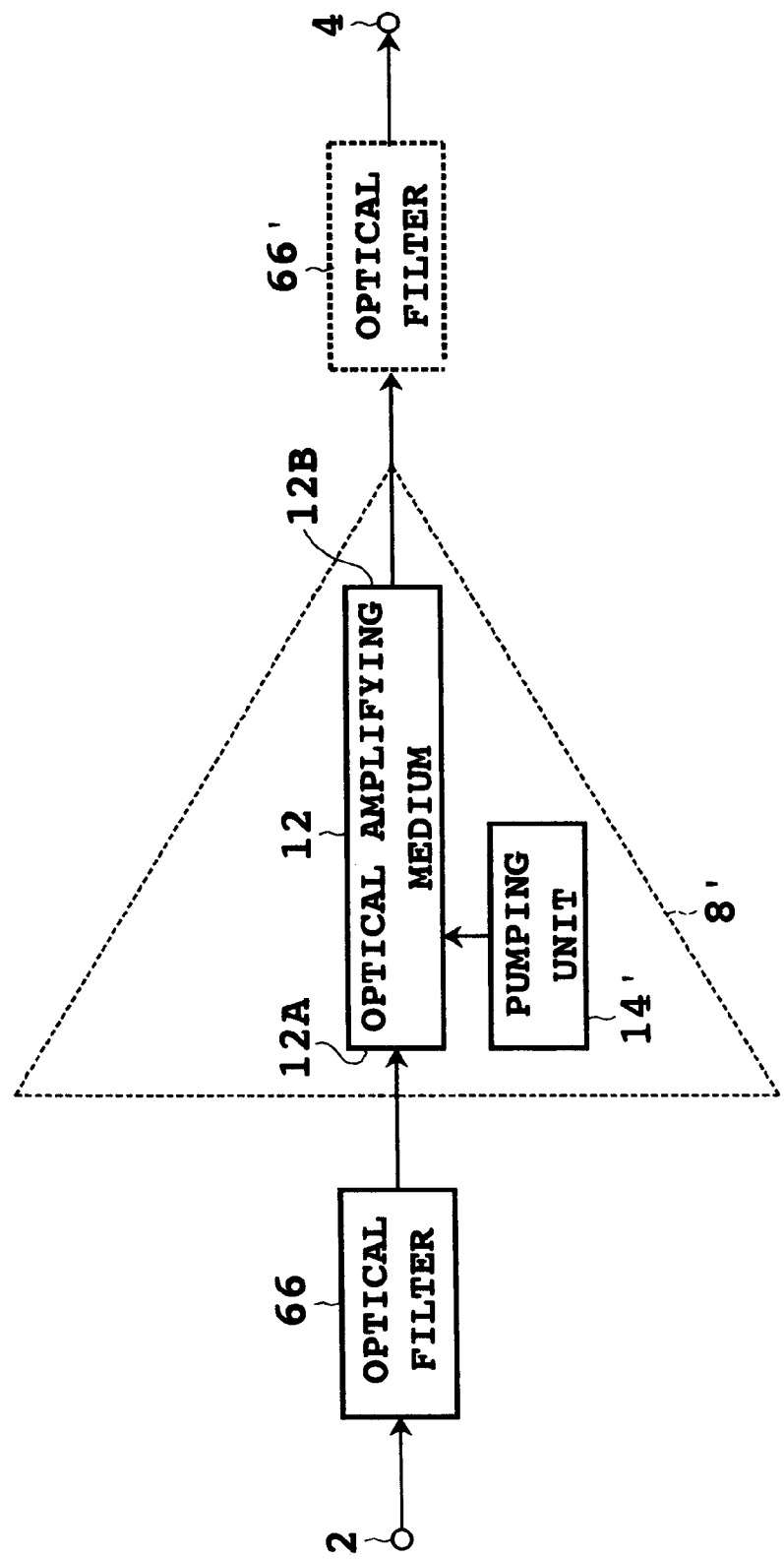

METHOD AND DEVICE FOR OPTICAL AMPLIFICATION AND SYSTEM HAVING THE DEVICE

BACKGROUND OF THE INVENTION

1. Field of the Invention

The present invention relates generally to optical amplification suitable for optical fiber communication using wavelength division multiplexed optical signals including a plurality of optical carriers having different wavelengths, and more particularly to a method and device for such optical amplification and a system having the device.

2. Description of the Related Art

In recent years, a manufacturing technique and using technique for a low-loss (e.g., 0.2 dB/km) optical fiber have been established, and an optical communication system using the optical fiber as a transmission line has been put to practical use. Further, to compensate for losses in the optical fiber and thereby allow long-haul transmission, the use of an optical amplifier for amplifying an optical signal has been proposed or put to practical use.

An optical amplifier known in the art includes an optical amplifying medium to which an optical signal to be amplified is supplied and means for pumping (exciting) the optical amplifying medium so that the optical amplifying medium provides a gain band including the wavelength of the optical signal. For example, an erbium doped fiber amplifier (EDFA) includes an erbium doped fiber (EDF) as the optical amplifying medium and a pump light source for supplying pump light having a predetermined wavelength to the EDF. By preliminarily setting the wavelength of the pump light within a 0.98 $\mu$m band or a 1.48 $\mu$m band, a gain band including a wavelength of 1.55 $\mu$m can be obtained. Further, another type optical amplifier having a semiconductor chip as the optical amplifying medium is also known. In this case, the pumping is performed by injecting an electric current into the semiconductor chip.

As a technique for increasing a transmission capacity by a single optical fiber, wavelength division multiplexing (WDM) is known. In a system adopting WDM, a plurality of optical carriers having different wavelengths are used. The plural optical carriers are individually modulated to thereby obtain a plurality of optical signals, which are wavelength division multiplexed by an optical multiplexer to obtain WDM optical signals, which are output to an optical fiber transmission line. On the receiving side, the WDM optical signals received are separated into individual optical signals by an optical demultiplexer, and transmitted data is reproduced according to each optical signal. Accordingly, by applying WDM, the transmission capacity in a single optical fiber can be increased according to the number of WDM channels.

In the case of incorporating an optical amplifier into a system adopting WDM, a transmission distance is limited by the wavelength dependence of gain which is represented by a gain tilt or gain deviation. For example, in an EDFA, it is known that complex gain characteristics are produced in a signal band, and the gain characteristics vary with total input power and pump light power to the EDFA.

To suppress the wavelength dependence of gain, combining an optical amplifier and an optical filter has been proposed. Configurations of the combination and effects obtained therefrom are described in detail in Japanese Patent Laid-open Nos. 3-44206, 3-196125, and 8-213676 and OAA'90, MD1, pp44–47.

In the case that the optical filter is placed on the upstream side (input side) of the optical amplifier in this combination, the noise figure becomes high (bad). In this case, the insertion loss by the optical filter can be compensated by adjusting the gain of the optical amplifier. Conversely, in the case that the optical filter is placed on the downstream side (output side) of the optical amplifier, the noise figure is not high, but the optical output power is lowered (reduced) by the insertion loss by the optical filter. Accordingly, it is necessary in the prior art to select either intention to high optical output power while allowing an increase in noise figure or intention to low noise while allowing a decrease in optical output power.

The wavelength dependence of gain in a band of 1540 to 1560 nm can be suppressed by suitably setting the power of pump light especially in an EDFA. In the case that the power of pump light is relatively low, a positive gain tilt such that the gain increases with an increase in wavelength is obtained, whereas in the case that the power of pump light is relatively high, a negative gain tilt such that the gain decreases with an increase in wavelength is obtained. Accordingly, the pump light power can be controlled so that the gain tilt becomes flat. However, the pump light power required to make the gain tilt flat is generally high, so that a high-power pump light source is required. A laser diode for obtaining high-power pump light is expensive. Further, in the case of using a plurality of laser diodes in combination to obtain high-power pump light, an optical circuit becomes complicated in configuration.

SUMMARY OF THE INVENTION

It is therefore an object of the present invention to provide a method for optical amplification which can obtain a low noise figure and high optical output power and can suppress the wavelength dependence of gain.

It is another object of the present invention to provide a device usable in performing the method.

It is still another object of the present invention to provide a device for optical amplification which can suppress the wavelength dependence of gain under the condition of low pump light power.

It is a further object of the present invention to apply the method or the device according to the present invention to a system such as an optical fiber communication system.

In accordance with a first aspect of the present invention, there is provided a device comprising an optical amplifier including an optical amplifying medium, and first and second optical filters operatively connected to the optical amplifier to suppress the wavelength dependence of gain. The optical amplifying medium has an input end and an output end for an optical signal. The optical amplifying medium is pumped so that the optical amplifying medium provides a gain band. The gain band includes a first band giving a relatively high gain and a relatively high noise figure to the optical signal and a second band giving a relatively low gain and a relatively low noise figure to the optical signal. The first optical filter is optically connected to the input end of the optical amplifying medium and has characteristics such that the first optical filter suppresses the wavelength dependence of gain in the second band. The second optical filter is, optically connected to the output end of the optical amplifying medium and has characteristics such that the second optical filter suppresses the wavelength dependence of gain in the first band.

According to the first aspect of the present invention, the two optical filters (the first and second optical filters) respectively provided on the input side and the output side of the optical amplifier are used to suppress the wavelength dependence of gain, thereby allowing suitable suppression of the wavelength dependence of gain in each optical filter and accordingly obtaining a low noise figure and high optical output power.

In accordance with a second aspect of the present invention, there is provided a method comprising the steps of (a) pumping an optical amplifying medium so that the optical amplifying medium provides a gain band including a first band giving a relatively high gain and noise figure to an optical signal and a second band giving a relatively low gain and noise figure to the optical signal; (b) supplying to the optimal amplifying medium the optical signal passed through a first optical filter having characteristics such that the first optical filter suppresses wavelength dependence of gain in the second band; and (c) supplying the optical signal output from the optical amplifying medium to a second optical filter having characteristics such that the second optical filter suppresses wavelength dependence of gain in the first band.

In the case of performing the method according to the second aspect of the present invention by using first and second optical amplifiers cascaded in a propagation direction of the optical signal, application of this method to the second optical amplifier is especially effective, because if this method is applied only to the first optical amplifier, there is a possibility that a new wavelength dependence of gain may occur in the second optical amplifier. Accordingly, in the case of performing this method by using a plurality of optical amplifiers cascaded more generally, application of this method to the optical amplifier on the last stage (i.e., on the output side) is effective.

In accordance with a third aspect of the present invention, there is provided a device comprising an optical amplifying medium having an input end and an output end for an optical signal; means for pumping the optical amplifying medium so that the optical amplifying medium has substantially simple gain characteristics in a predetermined band; and an optical filter optically connected to at least one of the input end and the output end of the optical amplifying medium and having characteristics such that the optical filter suppresses wavelength dependence of gain in the predetermined band.

Preferably, the optical amplifying medium comprises an EDF, and the predetermined band is provided by wavelengths of 1.54 to 1.56 μm. In this case, the above-mentioned substantially simple gain characteristics give a gain tilt such that the gain increases with an increase in wavelength, and the characteristics of the optical filter give a loss tilt such that the loss increases with an increase in wavelength.

According to the third aspect of the present invention, the substantially simple gain characteristics can be maintained under the condition of low pump light power, and the wavelength dependence of gain can be suppressed by the optical filter. Accordingly, the wavelength dependence of gain can be suppressed under the condition of low pump light power.

In accordance with a fourth aspect of the present invention, there is provided a device comprising a doped fiber doped with a dopant including Er (erbium); means for pumping the doped fiber so that the doped fiber has a gain tilt such that the gain increases with an increase in wavelength in a predetermined band; and an optical filter operatively connected to the doped fiber and having a loss tilt such that the optical filter suppresses the gain tilt.

In accordance with a fifth aspect of the present invention, there is provided a system comprising first and second terminal stations, an optical fiber transmission line connecting the first and second terminal station, and at least one optical repeater provided in the optical fiber transmission line. The first terminal station comprises a plurality of optical senders for respectively outputting a plurality of optical signals having different wavelengths, and an optical multiplexer for wavelength division multiplexing the plurality of optical signals to obtain WDM optical signals and outputting the WDM optical signals to the optical fiber transmission line. The second terminal station comprises an optical demultiplexer for separating the WDM optical signals transmitted by the optical fiber transmission line into a plurality of optical signals, and a plurality of optical receivers for respectively receiving the plurality of optical signals. The optical repeater comprises a device according to the first, third, or fourth aspect of the present invention or various preferred embodiments of the device to be hereinafter described.

In this specification, the wording that an element and another element are operatively connected includes the case that these elements are directly connected, and also includes the case that these elements are so provided as to be related with each other to such an extent that an electrical signal or an optical signal can be mutually transferred between these elements.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 10 is a block diagram showing a second basic configuration of the device according to the present invention;

DESCRIPTION OF THE PREFERRED EMBODIMENTS

Figure 1:
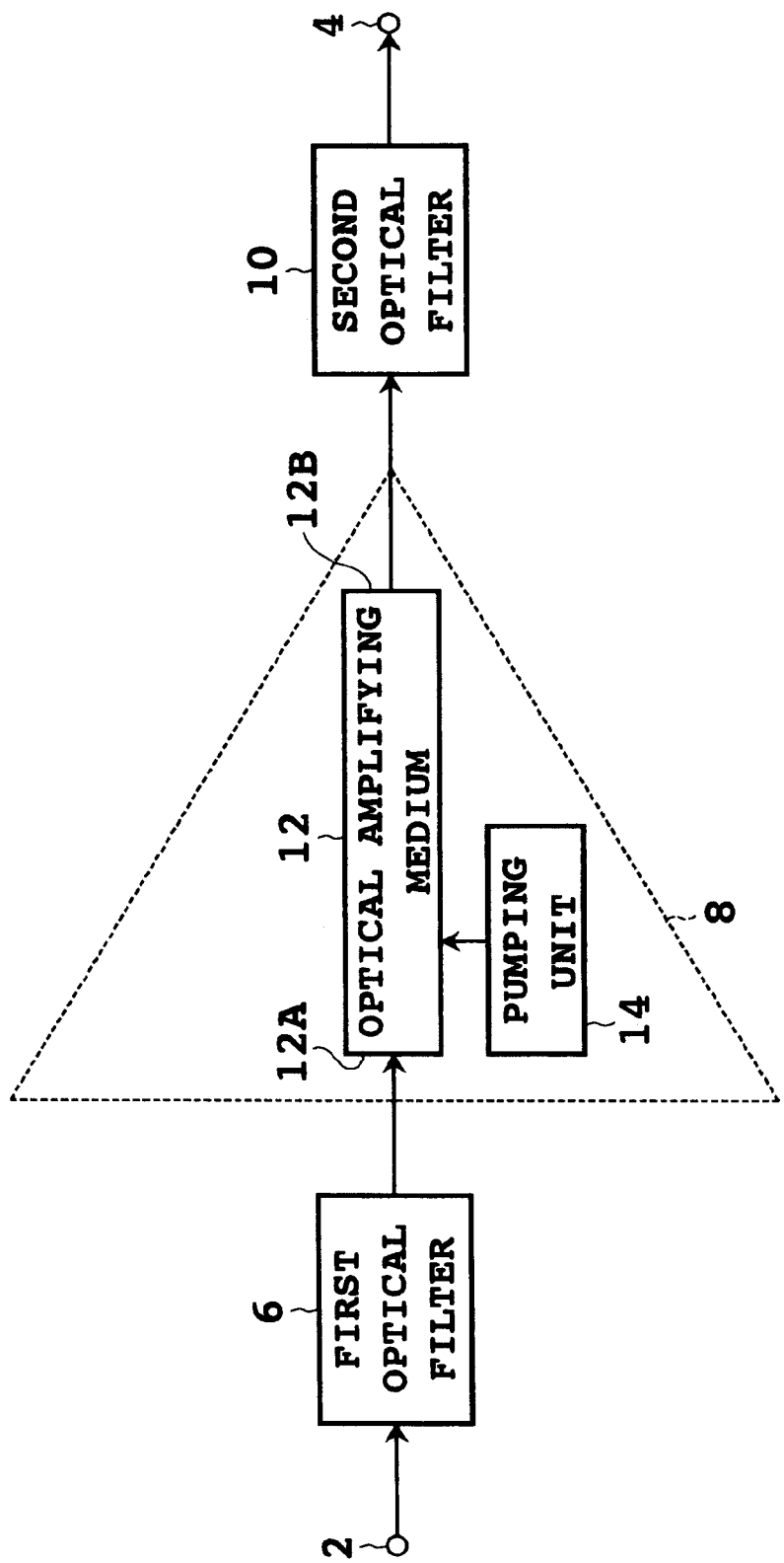
FIG. 1 is a block diagram showing a first basic configuration of the device according to the present invention.

Some preferred embodiments of the present invention will now be described in detail with reference to the attached drawings. Throughout the drawings, substantially the same parts are denoted by the same reference numerals.

FIG. 1 is a block diagram showing a first basic configuration of the device for optical amplification according to the present invention. The device shown in FIG. 1 has an input port 2 for receiving an optical signal to be amplified and an output port 4 for outputting the optical signal amplified. A first optical filter 6, an optical amplifier 8, and a second optical filter 10 are provided in this order along the propagation direction of the optical signal between the input port 2 and the output port 4. The optical amplifier 8 includes an optical amplifying medium 12 having an input end 12A and an output end 12B for the optical signal, and a pumping unit 14 for pumping the optical amplifying medium 12 so that the optical amplifying medium 12 provides a gain band.

Figure 2:
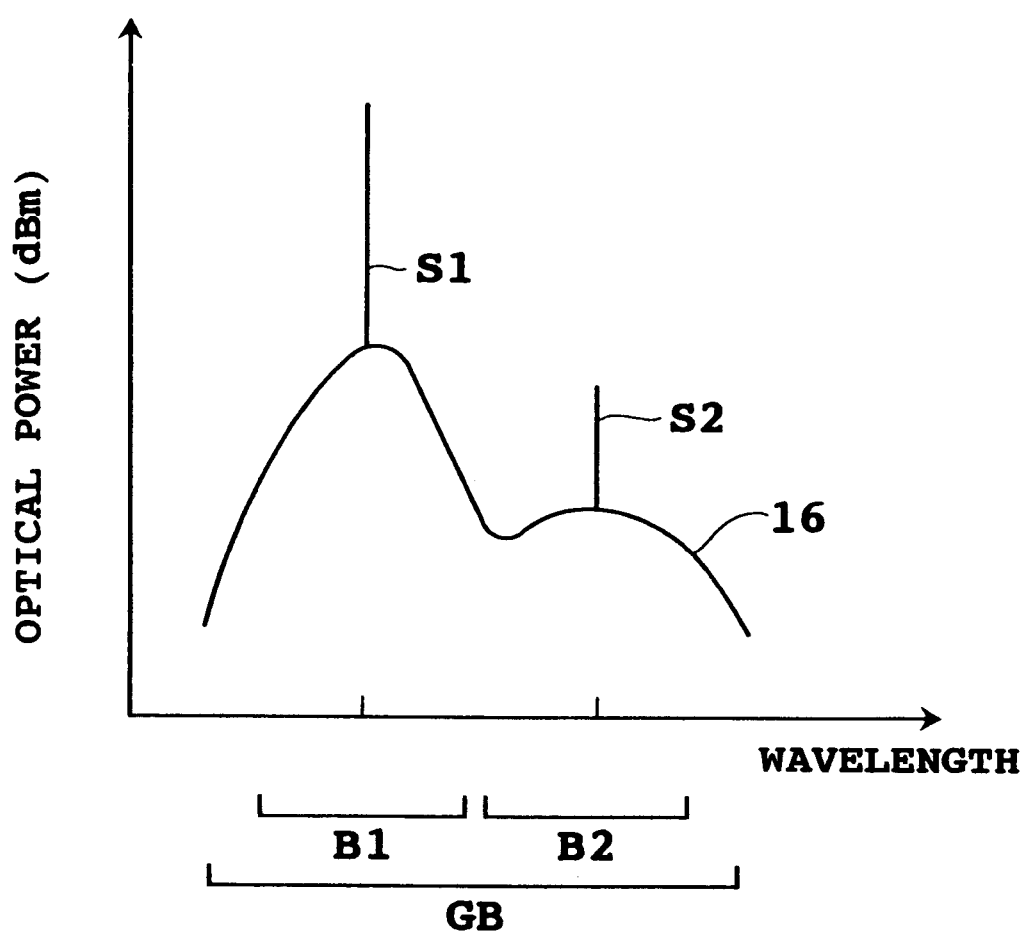
FIG. 2 is a graph for illustrating a gain band provided by an optical amplifying medium 1.2 shown in FIG. 1.

The gain band provided by the optical amplifying medium 12 shown in FIG. 1 will now be described with reference to FIG. 2. In FIG. 2, the vertical axis represents optical power (dBm) or gain (dB), and the horizontal axis represents wavelength. When the optical amplifying medium 12 is pumped by the pumping unit 14, a gain band GB giving gain characteristics 16 to the spectra S1 and S2 of the optical signal is generated. The gain characteristics 16 represent wavelength dependence of gain in the optical amplifying medium 12.

The gain characteristics for a small signal can be approximated with the spectrum of ASE amplified spontaneous emission) noise in the optical amplifying medium.

As shown in FIG. 2, the gain band GB includes a first band B1 giving a relatively high gain to the optical signal (the spectrum S1) and a second band B2 giving a relatively low gain to the optical signal (the spectrum S2). In the first band B1, the noise figure is high (bad) because of relatively high ASE noise generated. In the second band B2, the noise figure is low (good) because of relatively low ASE noise generated.

Figure 3A:
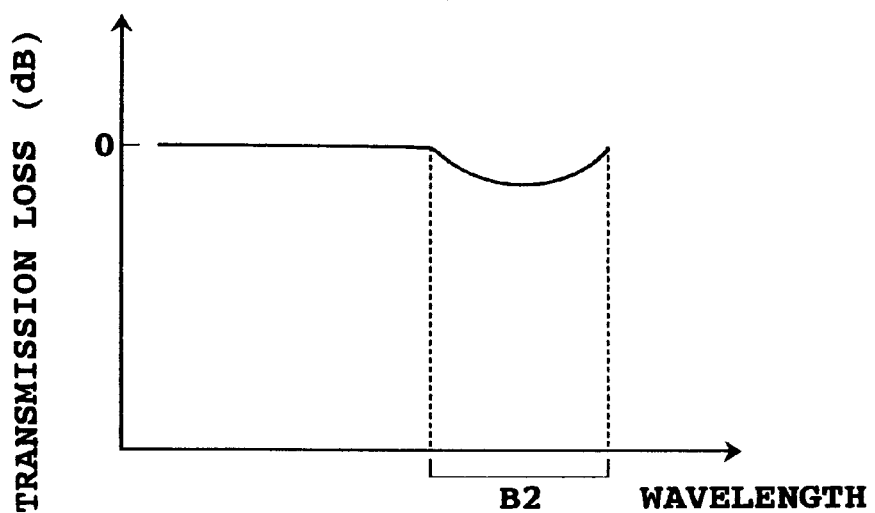
FIGS. 3A and 3B are graphs respectively showing an example of the characteristics of a first optical filter 6 and a second optical filter 10 shown in FIG. 1.
Figure 3B:
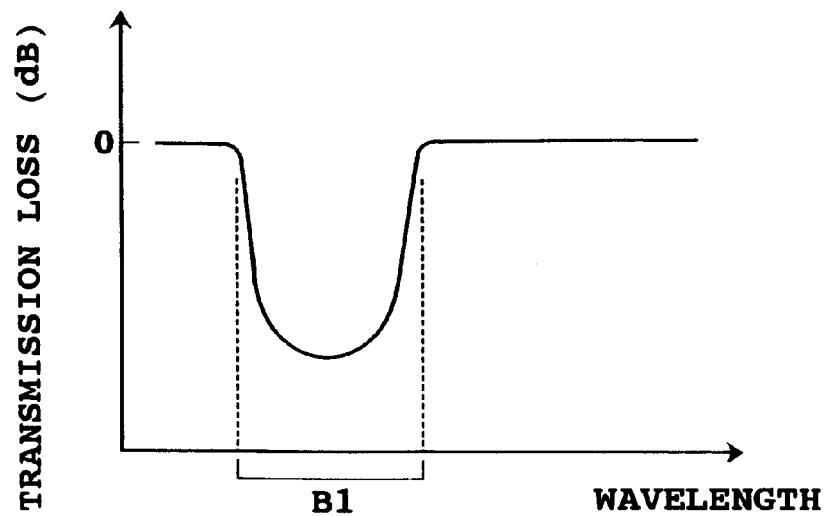

FIGS. 3A and 3B are graphs showing the characteristics of the first optical filter 6 and the second optical filter 10 shown in FIG. 1, respectively. In each graph, the vertical axis represents transmission loss (dB), and the horizontal axis represents wavelength. As shown in FIG. 3A, the first optical filter 6 has characteristics such that it suppresses (preferably cancels) the wavelength dependence of gain in the second band B2. At wavelengths not included in the second band B2, the transmission loss is given by a minimum insertion loss by the optical filter 6, which loss is ideally 0 (dB) and actually a small value. As shown in FIG. 3B, the second optical filter 10 has characteristics such that it suppresses (preferably cancels) the wavelength dependence of gain in the first band B1. At wavelengths not included in the first band B1, the transmission loss is given by a minimum insertion loss by the optical filter 10, which loss is ideally 0 (dB) and actually a small value.

Figure 4:
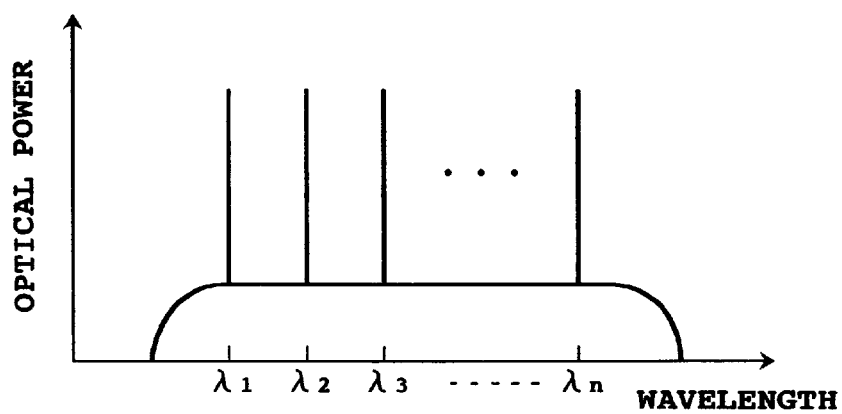
FIG. 4 is a graph showing an example of the spectrum of output light from the device shown in FIG. 1.

Referring to FIG. 4, there is shown an example of the spectra of output light from the device shown in FIG. 1. In this example, the optical signal to be input into the input port 2 is assumed to be WDM optical signals obtained by wavelength division multiplexing a plurality of optical signals having different wavelengths $\lambda 1$ to $\lambda n$, and the powers of all the optical signals are assumed to be equal to each other. As shown in FIG. 4, the amplified WDM optical signals to be output from the output port 4 have spectra obtained by superimposing steep spectra corresponding to the respective optical signals on a relatively flat ASE spectrum whose wavelength characteristics of gain are flattened, owing to the application of the present invention. As the wavelength dependence of gain in the optical amplifying medium 12 is suppressed by the first optical filter 6 and the second optical filter 10, the powers of the amplified WDM optical signals output from the device becomes substantially equal to each other. Thus, the wavelength dependence of gain can be suppressed by the first basic configuration of the device according to he present invention.

The present invention is not limited by the above case that the optical signal to be amplified comprises WDM optical signals. The optical signal to be amplified may be an optical signal in a single channel. In this case, there is a possibility that the wavelength of the optical signal changes with changes in temperature or the like of a light source for generating the optical signal. Accordingly, the present invention is effective also against wavelength changes of the optical signal in the single channel.

There will now be described in detail the reason why a low noise figure and a high optical output power can be obtained in the device shown in FIG. 1.

In the following description, a two-stage configuration obtained by cascading a front-stage optical amplifier and a rear-stage optical amplifier. In the case that an optical filter is inserted between the front-stage optical amplifier and the rear-stage optical amplifier in this two-stage configuration, a total noise figure (NF) is given by the following expression.

$$NF = 10 \log \left[ NF_f + \frac{10^{(NF_r + A)/10} - 1}{10^{G/10}} \right]$$

where $NF_f$ is the noise figure (dB) of the front-stage optical amplifier, $NF_r$ is the noise figure (dB) of the rear-stage optical amplifier, A is the loss (dB) by the optical filter, G is the gain (dB) of the front-stage optical amplifier, and each parameter is a function of wavelength.

Thus, the total noise figure NF in the two-stage configuration depends on the noise figure $NF_f$ and the gain G of the front-stage optical amplifier, the noise figure $NF_r$ of the rear-stage optical amplifier, and the loss A by the optical filter inserted between the front-stage optical amplifier and the rear-stage optical amplifier. The above expression shows that the smaller the insertion loss A by the optical filter, the lower the total noise figure NF.

In comparing the case where the optical filter is inserted between the front-stage optical amplifier and the rear-stage optical amplifier with the case where the optical filter is provided on the output side of the rear-stage optical amplifier rather than inserting the optical filter between the front-stage optical amplifier and the rear-stage optical amplifier, the total noise figure is lower in the latter case than in the former case provided that the loss by the optical filter is the same. That is, the total noise figure in the latter case is not deteriorated in principle by the loss by the optical filter.

Figure 5:
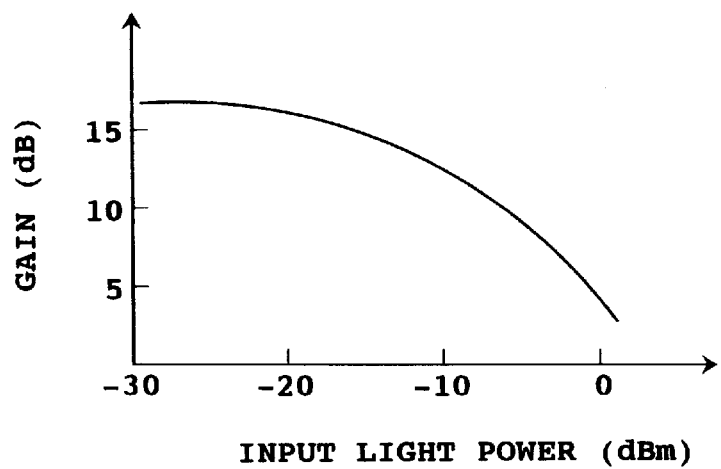
FIG. 5 is a graph showing an example of the relation between gain and input light power in an optical amplifier.

Therefore, in the case of applying the first basic configuration according to the present invention to the rear-stage optical amplifier, an optical filter for compensating a gain is provided on the output side of the rear-stage optical amplifier for an optical signal having a relatively high noise figure, so as not to further deteriorate the noise figure. However, in the case that the optical filter is provided on the output side of the rear-stage optical amplifier, the optical output power is reduced by the loss by the optical filter. To the contrary, in the case that the optical filter is inserted between the front-stage optical amplifier and the rear-stage optical amplifier, the insertion loss by the optical filter can be compensated by the input-gain characteristics of the rear-stage optical amplifier (see FIG. 5, for example). Therefore, in the case of applying the first basic configuration according to the present invention to the rear-stage optical amplifier, an optical filter for compensating a gain is inserted between the front-stage optical amplifier and the rear-stage optical amplifier for an optical signal having a relatively low noise figure, so as to obtain a maximum optical output power.

As mentioned above, insertion of the optical filter between the front-stage optical amplifier and the rear-stage optical amplifier deteriorates noise characteristics, and provision of the optical filter on the output side of the rear-stage optical amplifier reduces optical output power. Accordingly, an optical filter for correcting a gain for an optical signal whose noise figure and gain are higher than those of other optical signals is provided on the output side of the rear-stage optical amplifier. Further, an optical filter for correcting a gain for an optical signal whose noise figure and gain are lower than those of other optical signals is provided on the input side of the rear-stage optical amplifier. More generally speaking, a plurality of optical filters are provided at different positions to correct a gain with wavelength selectivity in the present invention. By paying attention to a signal sensitive to noise characteristics to correct a gain, each deterioration in noise figure from the case of using no optical filter can be avoided and a high optical output power can be obtained. Further, a deviation in noise figure is reduced according to the present invention, which will be described later with reference to the results of an experiment for verification.

Thus, according to the present invention, unlike conventional gain equalization such that optical outputs are equalized with respect to wavelength, a new technique so called optical SNR (signal-to-noise ratio) equalization is provided by the present invention. This technique has enabled both optical outputs to be maintained at uniform values and noise figures to be maintained at lower uniform values by taking notice of the fact that a transmission quality is determined by an optical SNR.

As the optical amplifying medium 12, a doped fiber doped with a dopant including a rare earth element may be used. In this case, the pumping unit 14 includes a pump light source for supplying pump light to the optical amplifying medium 12 from at least one of the first end 12A and the second end 12B of the optical amplifying medium 12. To obtain a gain band including a wavelength of 1.55 $\mu$m, a dopant including Er (erbium) is selected. In this case, the first band B1 is provided by wavelengths of 1.52 to 1.54 $\mu$m, and the second band B2 is provided by wavelengths of 1.54 to 1.56 $\mu$m or 1.54 to 1.58 $\mu$m, for example. In the case that the dopant includes Er, the wavelength of the pump light falls preferably in a 0.98 $\mu$m band (0.96 to 1.00 $\mu$m) or in a 1.48 m band (1.46 to 1.50 $\mu$m). A semiconductor chip may also be used as the optical amplifying medium 12. In this case, the pumping unit 14 includes a current source for injecting an electric current into the semiconductor chip.

Each of the first optical filter 6 and the second optical filter 10 is required to have the following properties.
(a) Realization of design values of transmission characteristics with good accuracy.
(b) Reduced temperature dependence of transmission characteristics.
(c) Reduced insertion loss.
(d) Reduced polarization dependence.
(e) Reduced wavelength dispersion.
(f) Emission of reflected light (removed light) out of a signal transmission line.

To satisfy one or more of these requirements, a Mach-Zehnder optical filter (e.g., InGaAsP/InP semiconductor), an interference film optical filter (dielectric multilayer film), or a fiber grating optical filter may be used as each of the first optical filter 6 and the second optical filter 10. In particular, by use of a fiber grating as will be hereinafter described, many of the above-mentioned requirements can be satisfied.

Figure 6:
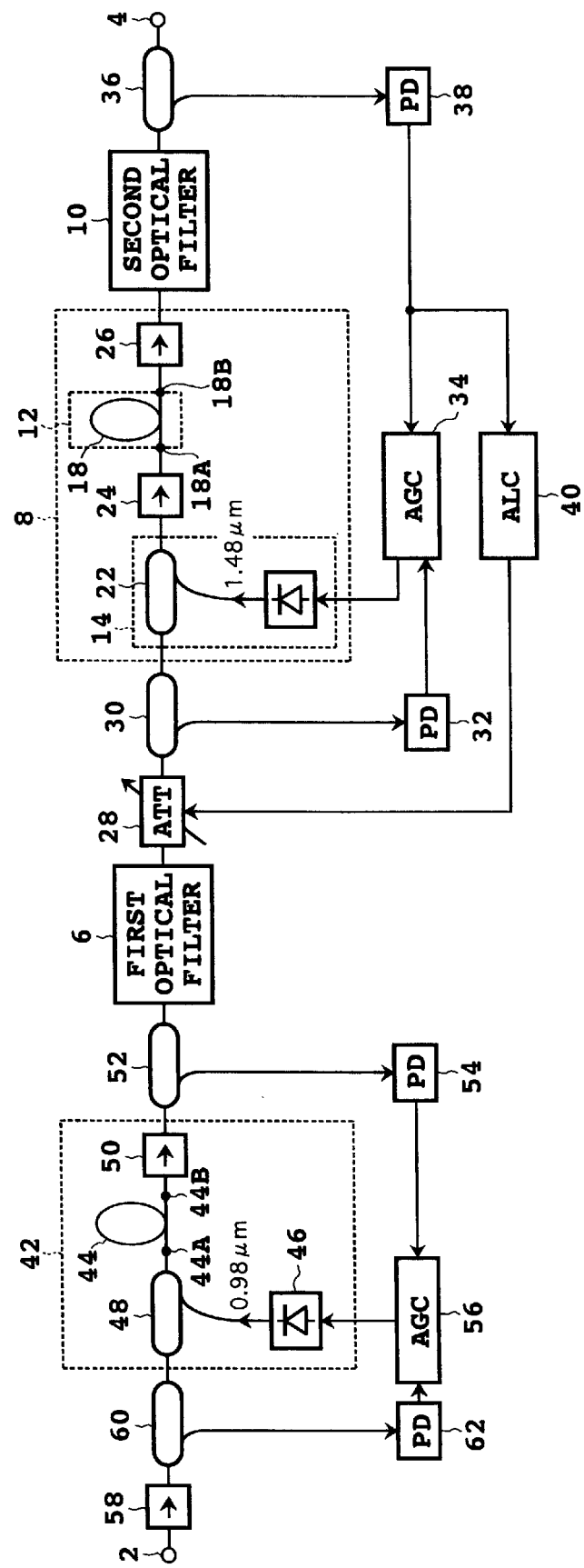
FIG. 6 is a block diagram showing a preferred embodiment of the device shown in FIG. 1.

FIG. 6 is a block diagram showing a preferred embodiment of the device shown in FIG. 1. In this preferred embodiment, an erbium doped fiber (EDF) 18 is used as the optical amplifying medium 12 of the optical amplifier 8. To broaden the gain band, the EDF 18 may be further doped with a compound of Al (aluminum). The pumping unit 14 includes a pump light source 20 for outputting pump light having a wavelength included in a 1.48 $\mu$m band and a WDM coupler 22 for supplying the pump light to the EDF 18 from a first end 18A of the EDF 18. The optical amplifier 8 further has an optical isolator 24 connected between the WDM coupler 22 and the first end 18A of the EDF 18, and an optical isolator 26 connected between a second end 18B of the EDF 18 and the second optical filter 10.

A variable optical attenuator 28 and a directional coupler 30 for obtaining input monitoring light are provided in this order along the propagation direction of the optical signals between the first optical filter 6 and the WDM coupler 22. The input monitoring light is supplied to a photodetector (PD) 32 such as a photodiode. An electrical signal output from the photodetector 32 reflects an input level of the optical amplifier 8, and this electrical signal is supplied to an automatic gain control (AGC) circuit 34 for maintaining the gain characteristics constant. A directional coupler 36 for obtaining output monitoring light is provided between the second optical filter 10 and the output port 4. The output monitoring light is supplied to a photodetector 38. An electrical signal output from the photodetector 38 reflects an output level of the optical amplifier 8, and this electrical signal is supplied to the AGC circuit 34. The AGC circuit 34 controls the power of the pump light to be output from the pump light source 20 according to the input level and the output level of the optical amplifier 8, so that the gain characteristics given by the EDF 18 are maintained constant. For example, the AGC circuit 34 adjusts the power of the pump light so that the ratio between the input level and the output level of the optical amplifier 8 becomes constant. The output electrical signal from the photodetector 38 is supplied also to an automatic level control (ALC) circuit 40. The ALC circuit 40 controls attenuation by the variable optical attenuator 28 so that the output level of the optical amplifier 8 is maintained constant.

In particular, a second optical amplifier 42 is additionally provided on the upstream side of the first optical filter 6 in this preferred embodiment. That is, this device has a two-stage configuration, and the optical amplifiers 42 and 8 function as a front-stage optical amplifier and a rear-stage optical amplifier, respectively. By making the optical amplifier 42 plural, this device can be modified into a multistage configuration.

The optical amplifier 42 includes an EDF 44, a pump light source 46 for outputting pump light having a wavelength included in a 0.98 μm band, and a WDM coupler 48 for supplying the pump light to the EDF 44 from a first end 44A of the EDF 44. A second end 44B of the EDF 44 is connected through an optical isolator 50 and a directional coupler 52 to the first optical filter 6. Output monitoring light branched by the directional coupler 52 is supplied to a photodetector 54. An electrical signal output from the photodetector 54 reflects an output level of the optical amplifier 42, and this electrical signal is supplied to an AGC circuit 56. An optical isolator 58 and a directional coupler 60 are provided in this order along the propagation direction of the optical signals between the input port. 2 and the WDM coupler 48. Input monitoring light branched by the directional coupler 60 is supplied to a photodetector 62. An electrical signal output from the photodetector 62 reflects an input level of the optical amplifier 42, and this electrical signal is supplied to the AGC circuit 56. The AGC circuit 56 controls the power of the pump light to be output from the pump light source 46 according to the input level and the output level of the optical amplifier 42, so that the gain characteristics given by the EDF 44 are maintained constant. For example, the AGC circuit 56 adjusts the power of the pump light so that the ratio between the input level and the output level of the optical amplifier 42 becomes constant.

As each of the pump light sources 20 and 46, a laser diode (LD) may be used. In this case, the power of each pump light may be adjusted by a drive current for each laser diode.

The WDM optical signals input to the input port 2 are first amplified by the front-stage optical amplifier 42. In this amplification process, the gain characteristics (wavelength dependence of gain) are maintained constant irrespective of the input level of the optical amplifier 42 by adopting the AGC circuit 56. The WDM optical signals amplified are next passed through the first optical filter 6. In the optical filter 6, gain compensation is performed on the optical signals included in the second band B2. The WDM optical signals passed through the filter 6 are subjected to controlled attenuation by the variable optical attenuator 28, and next supplied to the rear-stage optical amplifier 8. In the amplification process in the optical amplifier 8, the gain characteristics are maintained constant irrespective of the input level of the optical amplifier 8 by adopting the AGC circuit 34. The WDM optical signals amplified by the optical amplifier 8 are next passed through the second optical filter 10. In the filter 10, gain compensation is performed on the optical signals included in the first band B1. The WDM optical signals passed through the filter 10 are output from the output port 4.

The output optical power can be maintained constant irrespective of the input level by adopting the ALC circuit 40 and the variable optical attenuator 28. The reason why the ALC for the output optical power is performed by using the variable optical attenuator 28 is that the power of each pump light is controlled to maintain constant the gain characteristics in each of the optical amplifiers 8 and 42 and therefore the ALC cannot be performed by adjusting the power of each pump light.

Since the gain characteristics in each of the optical amplifiers 8 and 42 are maintained constant, the wavelength dependence of gain in this device can be always suppressed in spite of the fact that each of the filters 6 and 10 has fixed characteristics. That is, the wavelength dependence of gain can be suppressed irrespective of the input level.

The reason why the wavelength of the pump light in the front-stage optical amplifier 42 is set in the 0.98 μm band in this preferred embodiment is to prevent large deterioration in noise characteristics in the amplification process for optical signals having relatively low powers. The pumping of the EDF by the pump light having a wavelength included in the 0.98 μm band is effective for reduction in noise of the optical amplifier. Further, the reason why the wavelength of the pump light in the rear-stage optical amplifier 8 is set in the 1.48 μm band is to obtain a high optical output power. Increasing the output of a laser diode oscillating in a 1.48 μm band is easier than increasing the output of a laser diode oscillating in a 0.98 μm band. Accordingly, by using such high-power pump light, the optical output power of the device can be increased.

In the preferred embodiment shown in FIG. 6, the optical signals and the pump light propagate in the same direction in the EDF in each of the optical amplifiers 8 and 42. That is, forward pumping is performed. Alternatively, backward pumping such that the optical signals and the pump light propagate in opposite directions in each optical amplifying medium may be performed. Further, by using two pump light sources for each optical amplifying medium, both forward pumping and backward pumping may be performed to each optical amplifying medium. That is, bidirectional pumping may be performed. In this case, hybrid bidirectional pumping using different wavelengths of pump light (e.g., 0.98 μm and 1.48 μm) may be realized in each optical amplifier.

While the first optical filter 6, the variable optical attenuator 28, and the directional coupler 30 are arranged in this order along the propagation direction of the optical signals, the order of arrangement of these components is arbitrary. Further, the order of arrangement of the second optical filter 10 and the directional coupler 36 may be reversed. That is, each of the filters 6 and 10 may be located either inside or outside of an AGC loop.

FIGS. 7A to 7D are block diagrams showing the configurations of devices used in a comparative verification experiment for verifying the priority of the first basic configuration according to the present invention over the prior art.

Figure 7A:
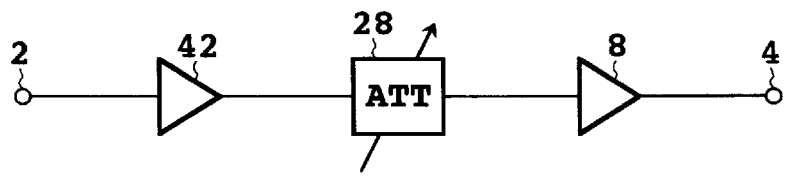
FIGS. 7A to 7D are block diagrams showing the configurations of devices used in a comparative verification experiment.

FIG. 7A shows the prior art of a two-stage configuration using no optical filter. A front-stage optical amplifier 42, a variable optical attenuator 28, and a rear-stage optical amplifier 8 are provided in this order along the propagation direction of an optical signal between an input port 2 and an output port 4.

Figure 7B:
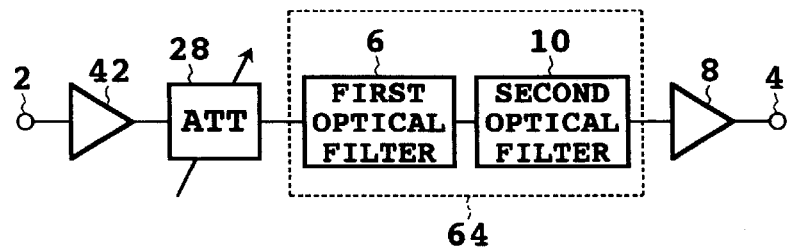

FIG. 7B shows the prior art in which an optical filter is inserted only within a two-stage configuration. A front-stage optical amplifier 42, a variable optical attenuator 28, a combined optical filter 64, and a rear-stage optical amplifier 8 are provided in this order along the propagation direction of an optical signal between an input port 2 and an output port 4. The combined optical filter 64 is configured by cascading a first optical filter 6 and a second optical filter 10 applicable to the present invention.

Figure 7C:
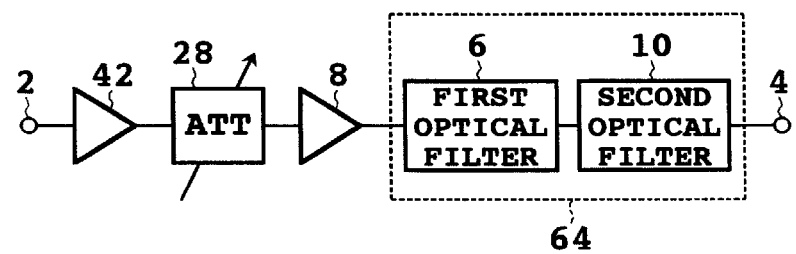

FIG. 7C shows the prior art in which an optical filter is provided only on the output side of a two-stage configuration. A combined optical filter 64 is provided between a rear-stage optical amplifier 8 and an output port 4.

Figure 7D:
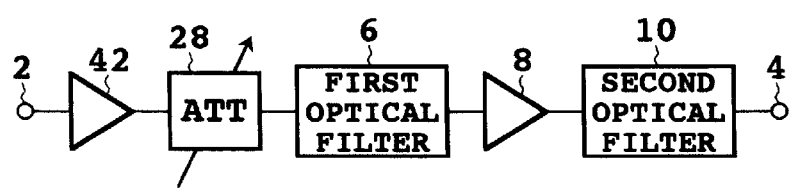

FIG. 7D shows a device to which the present invention is applied. A front-stage optical amplifier 42, a variable optical attenuator 28, a first optical filter 6, a rear-stage optical amplifier 8, and a second optical filter 10 are provided in this order along the propagation direction of an optical signal between an input port 2 and an output port 4.

In this experiment, the power of pump light in each front-stage optical amplifier 42 was set at 100 mW, and the power of pump light in each rear-stage optical amplifier 8 was set at 150 mW. Further, the attenuation in each variable optical attenuator 28 was set at −12.7 dB.

Figure 8A:
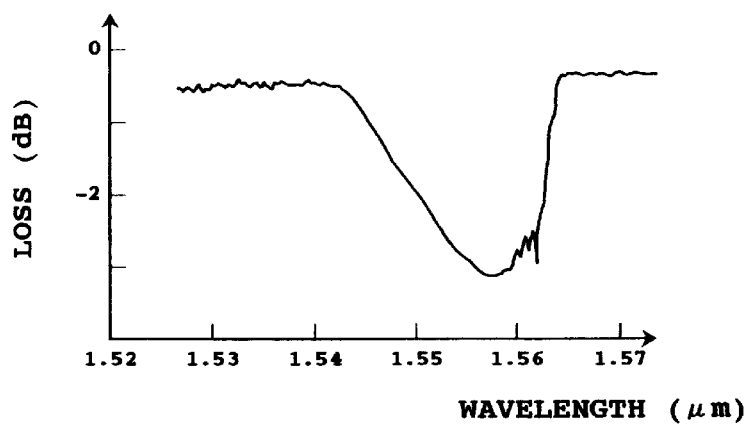
FIGS. 8A to 8C are graphs showing the characteristics of optical filters used in the experiment.
Figure 8B:
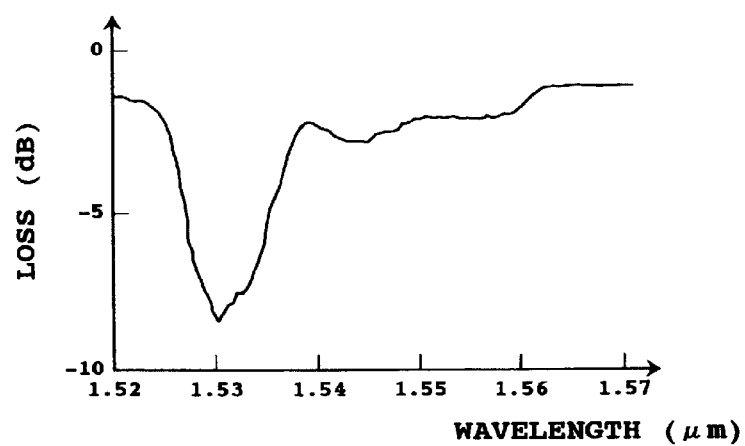
Figure 8C:
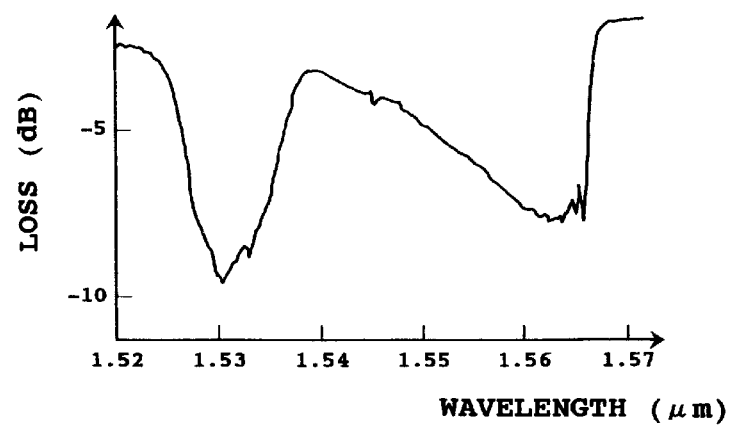
Figure 9A:
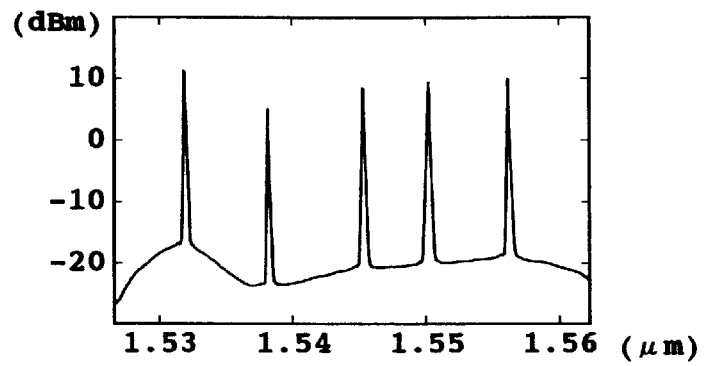
FIGS. 9A to 9D are graphs showing the spectra obtained in the experiment.
Figure 9B:
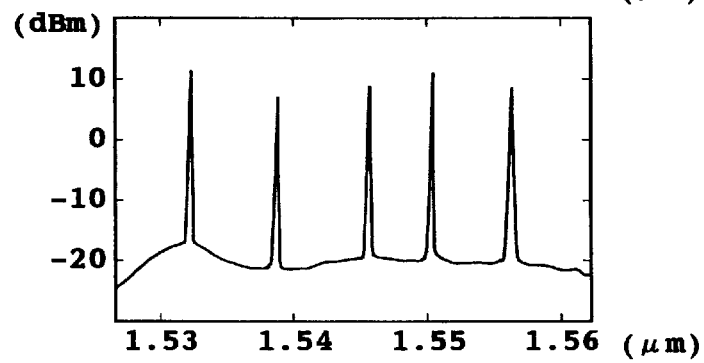
Figure 9C:
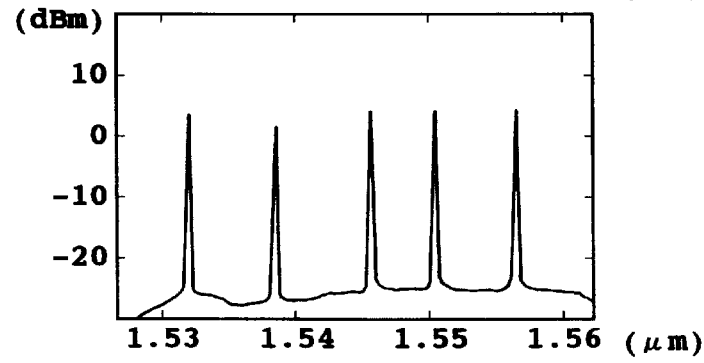
Figure 9D:
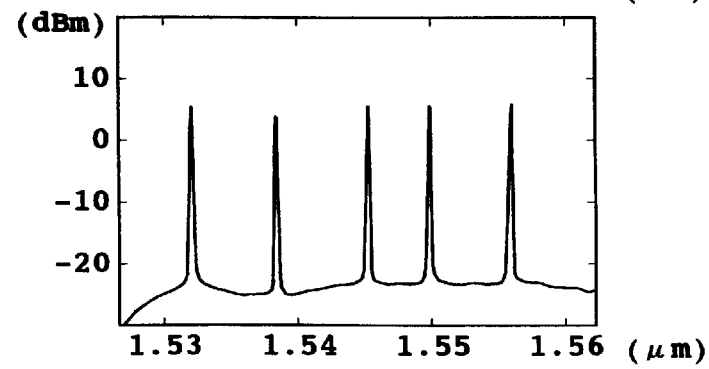

FIGS. 8A, 8B, and 8C are graphs showing the characteristics of the first optical filter 6, the second optical filter 10, and the combined optical filter 64 used in this experiment, respectively. In each graph, the vertical axis represents transmission loss (dB), and the horizontal axis represents wavelength (gm). Each of the filters 6, 10, and 64 used in this experiment was provided by a fiber grating or fiber gratings. As shown in FIG. 8A, the first optical filter 6 has characteristics such that it suppresses the wavelength dependence of gain in a band of about 1.54 µm to about 1.56 µm giving a relatively low gain and noise figure. As shown in FIG. 8B, the second optical filter 10 has characteristics such that it suppresses the wavelength dependence of gain in a band of about 1.52 µm to about 1.54 µm giving a relatively high gain and noise figure. As shown in FIG. 8C, the combined filter 64 has characteristics such that is suppresses the wavelength dependence of gain in a band of about 1.52 µm to about 1.56 µm.

FIGS. 9A, 9B, 9C, and 9D are graphs showing the spectra of output light obtained by the configurations shown in FIGS. 7A, 7B, 7C, and 7D, respectively. In each graph, the vertical axis represents optical power (dBm), and the horizontal axis represents wavelength (µm). In this experiment, WDM optical signals obtained by wavelength division multiplexing optical signals in five channels having different wavelengths included in a band of 1.52 to 1.56 µm were used. The peak power of the optical signal in each channel at each input port 2 was set at −19.9 dBm. In the experiment, a minimum optical output power $P_{min}$ (dBm), an optical output power deviation (a deviation between a maximum optical output power and a minimum optical output power) ΔP (dB), a maximum (worst) noise figure $NF_{max}$ (dB), and a noise figure deviation (a deviation between a maximum (worst) noise figure and a minimum (best) noise figure) ΔNF (dB) were measured in the configuration of each of FIGS. 7A to 7D. The results of measurement were compared, which are shown in Table 1.

TABLE 1

|  | FIG. 7A | FIG. 7B | FIG. 7C | FIG. 7D |
| --- | --- | --- | --- | --- |
| $P_{min}$(dBm) | 4.50 | 6.15 | 1.52 | 3.35 |
| ΔP(dB) | 6.37 | 3.47 | 2.36 | 2.11 |
| $NF_{max}$(db) | 6.442 | 7.042 | 6.452 | 6.422 |
| ΔNF(db) | 0.73 | 0.73 | 0.89 | 0.35 |

The following advantages of the configuration of FIG. 7D should be understood from the comparison of the above experimental results.

(1) In comparison with FIG. 7C, the noise figure deviation ΔNF was reduced by 0.54 (=0.89–0.35) dB.

(2) In comparison with FIG. 7B, the maximum noise figure $NF_{max}$ was improved by 0.62 (=7.042–6.422) dB.

(3) In comparison with FIG. 7A, the optical output power deviation ΔP was reduced by 4.26 (=6.37–2.11) dB.

(4) In comparison with FIG. 7C, the minimum optical output power $P_{min}$ was improved by 1.83 (=3.35–1.52) dB.

(5) In comparison with FIG. 7B, the noise figures of the optical signals in all the channels were improved (0.62 dB at the maximum).

(6) In comparison with FIG. 7C, the optical output powers of the optical signals in all the channels were increased.

Thus, the technical advantages obtained by the application of the first basic configuration according to the present invention to the last stage in the multistage configuration were verified.

In all the configurations of FIGS. 7A to 7D, the minimum optical output power $P_{min}$ was given by the optical signal in the second-shortest wavelength channel of the five channels used in the experiment, and the maximum noise figure $NF_{max}$ was given by the optical signal in the shortest wavelength channel.

FIG. 10 is a block diagram showing a second basic configuration of the device according to the present invention. This device has an input port 2 for receiving an optical signal to be amplified and an output port 4 for outputting the optical signal amplified. The optical signal may be an optical signal in a single wavelength channel having a possibility of wavelength variations or may be WDM optical signals obtained by wavelength division multiplexing a plurality of optical signals having different wavelengths. An optical filter 66 and an optical amplifier 8' are provided in this order along the propagation direction of the optical signal between the input port 2 and the output port 4. The optical filter 66 may be replaced by an optical filter 66' provided between the optical amplifier 8' and the output port 4. The optical amplifier 8' includes an optical amplifying medium 12 having an input end 12A and an output end 12B for the optical signal and a pumping unit 14' for pumping the optical amplifying medium 12. In this configuration, the pumping unit 14' pumps the optical amplifying medium 12 so that the optical amplifying medium 12 has substantially simple gain characteristics in a predetermined band. The optical filter 66 or 66' has characteristics such that it suppresses the wavelength dependence of gain given by the above substantially simple gain characteristics.

As the optical amplifying medium 12, a doped fiber doped with a dopant including a rare earth element may be used. In this case, the pumping unit 14' includes a pump light source for supplying pump light having a suitable wavelength and power to the optical amplifying medium 12 from at least one of the input end 12A and the output end 12B of the optical amplifying medium 12. In the case that the predetermined band includes 1.55 µm, a dopant including Er (erbium) is suitable for the doped fiber. In this case, the predetermined band is provided by wavelengths of 1.54 to 1.56 µm, for example, and the wavelength of the pump light is included in at least one of a 0.98 µm band and a 1.48 µm band. A semiconductor chip may also be used as the optical amplifying medium 12. In this case, the pumping unit 14' includes a current source for injecting an electric current into the semiconductor chip.

Figure 11:
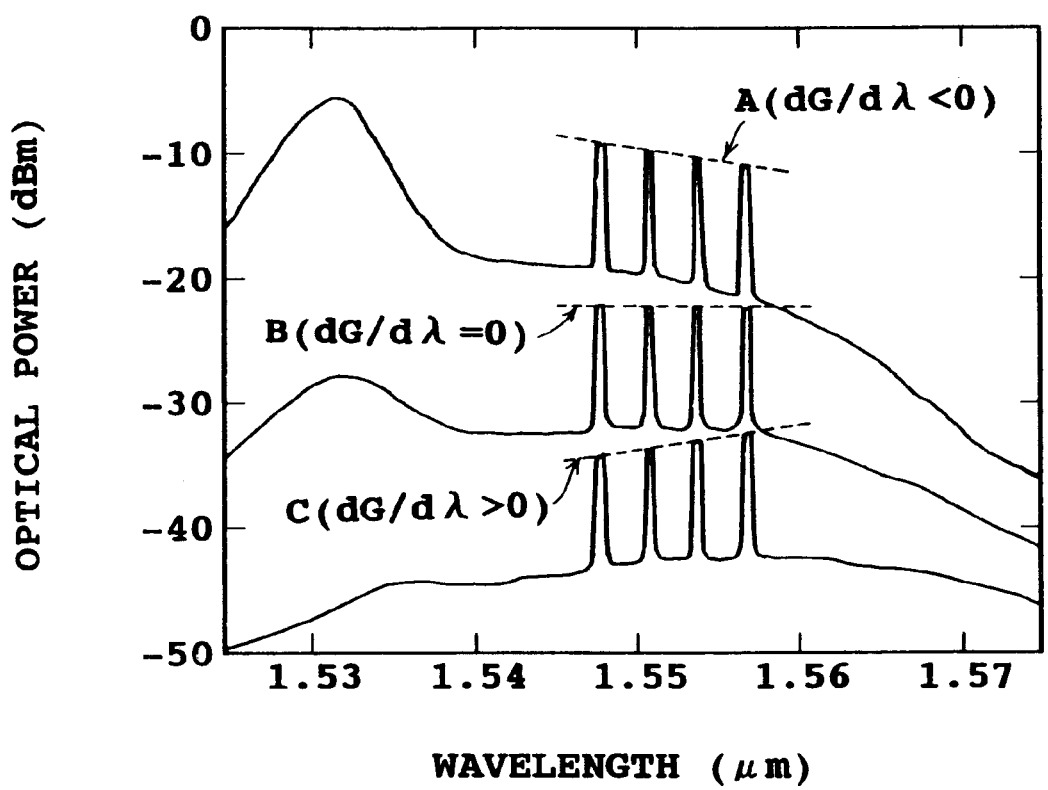
FIG. 11 is a graph for illustrating changes in gain tilt according to pump light power.

FIG. 11 is a graph showing an example of the gain characteristics of the optical amplifier 8' in the case that the optical amplifying medium 12 includes an EDF (erbium doped fiber). There are shown in FIG. 11 the spectra of output light when WDM optical signals in four channels having wavelengths of 1548, 1551, 1554, and 1557 nm are input with the same input power into the EDF being pumped. In FIG. 11, the vertical axis represents optical power (dBm), and the horizontal axis represents wavelength (µm).

The spectrum shown by A corresponds to the case where the power of the pump light is relatively high, causing a negative gain tilt in a band of about 1.54 μm to about 1.56 μm. That is, the negative gain tilt is a gain tilt such that the gain increases with an increase in wavelength, and the derivative of gain (G) with respect to wavelength (λ) is negative (dG/dλ<0).

The spectrum shown by C corresponds to the case where the power of the pump light is relatively low, causing a positive gain tilt in a band of about 1.54 μm to about 1.56 μm. That is, the positive gain tilt is a gain tilt such that the gain increases with an increase in wavelength, and the derivative of gain with respect to wavelength is positive (dG/dλ>0).

The spectrum shown by B corresponds to the case where the power of the pump light is optimal so that no tilt gain is caused in a band of about 1.54 μm to about 1.56 μm, and the derivative of gain with respect to wavelength is zero (dG/dλ=0)

Each spectrum has such a shape that four sharp spectra corresponding to the optical signals in the four channels are superimposed on an ASE spectrum.

Further, in each spectrum, complex gain characteristics are produced in a band including wavelengths shorter than 1.54 μm, whereas substantially simple gain characteristics are obtained in a band of about 1.54 μm to about 1.56 μm. For example, in the case that WDM is applied to a system including an optical amplifier, and if gain tilt is caused in the optical amplifier, a gain deviation between channels limits a transmission distance. Therefore, it is desirable to optimize the driving conditions of the optical amplifier so that the spectrum shown by B is always obtained. As conventional means for maintaining the spectrum as shown by B to eliminate gain tilt, the gain of an optical amplifier is monitored and the power of pump light is feedback controlled so that a monitored value of the gain becomes constant. However, the power of pump light to eliminate gain tilt is high, so that a high-power and low-cost pump light source is required to eliminate gain tilt only by the control of the pump light power.

In the second basic configuration according to the present invention, control of the gain characteristics of the optical amplifying medium 12 and use of the optical filter 66 or 66' are combined. Accordingly, the wavelength dependence of gain can be suppressed with low pumping power (e.g., low pump light power). For example, the optical amplifying medium 12 is pumped by the pumping unit 14' so as to have a positive gain tilt in a band of about 1.54 μm to about 1.56 μm as shown by C in FIG. 11. In this case, the characteristics of the optical filter 66 or 66' are given a loss tilt such that the loss increases with an increase in wavelength. Accordingly, the wavelength dependence of gain can be suppressed with low pump light power.

Figure 12:
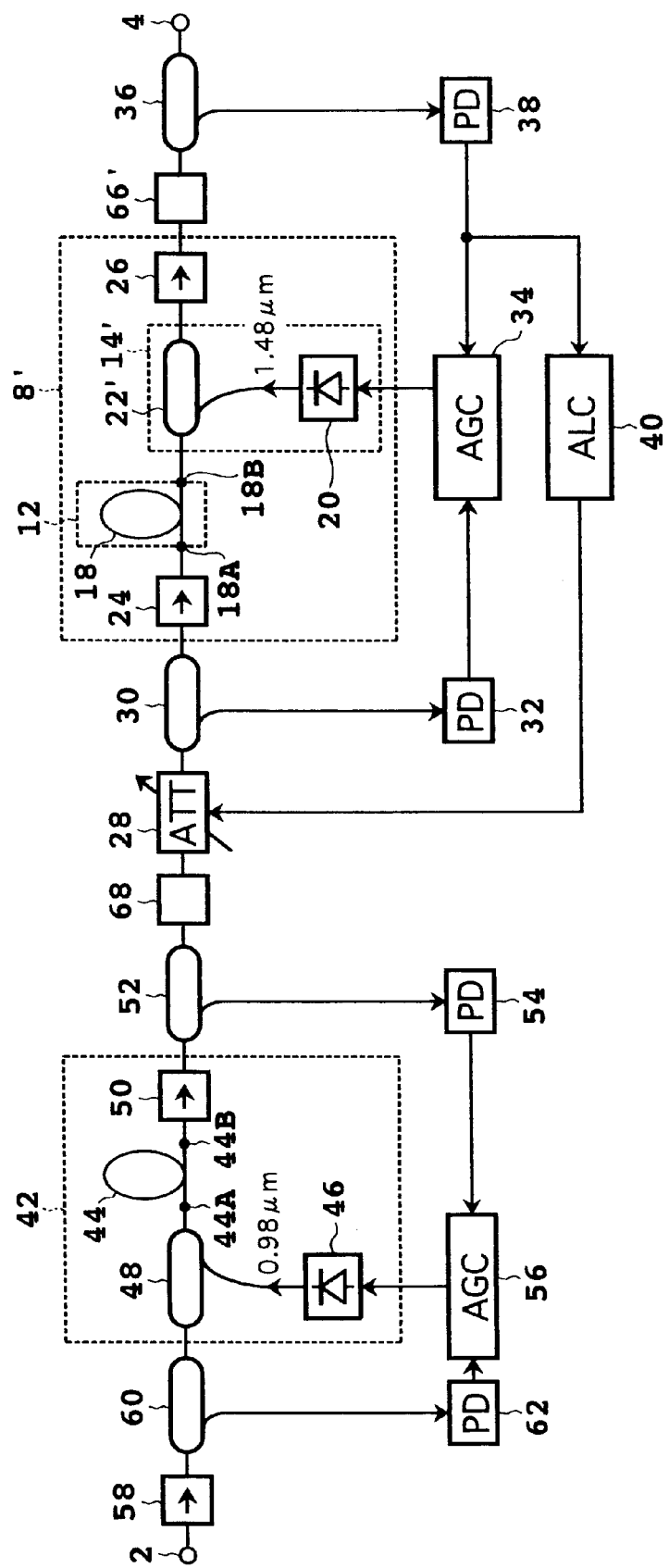
FIG. 12 is a block diagram showing a preferred embodiment of the device shown in FIG. 10.

FIG. 12 is a block diagram showing a preferred embodiment of the device shown in FIG. 10. This preferred embodiment is different from the preferred embodiment shown in FIG. 6 in the following points.

(1) The optical amplifier 8' according to the second basic configuration of the present invention is provided in place of the optical amplifier 8 according to the first basic configuration of the present invention.

(2) Since the preferred embodiment shown in FIG. 12 is based on the premise that optical signals having wavelengths included in a band of about 1.54 μm to about 1.56 μm are used, a rejection filter 68 having a rejection band falling within a 1.53 μm band (e.g., 1.52 to 1.54 μm) is provided in place of the first optical filter 6 used in the first basic configuration of the present invention.

(3) The optical filter 66' according to the second basic configuration of the present invention is provided in place of the second optical filter 10 used in the first basic configuration of the present invention.

In the optical amplifier 8', a WDN coupler 22' connected to a pump light source 20 is provided between a second end 18B of an EDF 18 and an optical isolator 26, so as to supply pump light output from the pump light source 20 to the EDF 18 from the second end 18B. The power of the pump light to be output from the pump light source 20 is controlled so that substantially simple gain characteristics produced in the EDF 18 are maintained constant by an AGC circuit 34. More specifically, the AGC circuit 34 adjusts the power of the pump light so that the ratio between the input level and the output level of the optical amplifier 8' or the combined optical amplifier 8' and optical filter 66' becomes constant.

Figure 13:
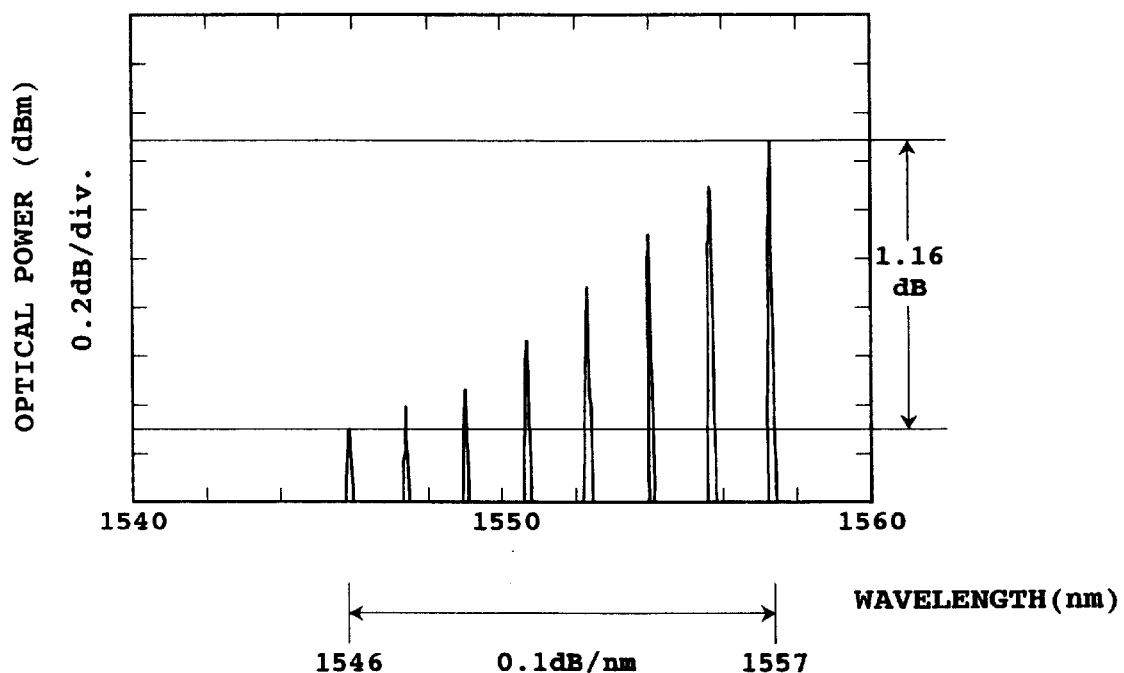
FIG. 13 is a graph showing a gain tilt in an optical amplifier 8' shown in FIG. 12.

An example of the gain characteristics maintained constant by the AGC circuit 34 will now be described with reference to FIG. 13. By the gain characteristics shown, the optical amplifier 8' is given a gain tilt such that the gain increases with an increase in wavelength. In FIG. 13, the vertical axis represents optical power (dBm), and the horizontal axis represents wavelength (nm). This example employs WDM optical signals obtained by wavelength division multiplexing optical signals in eight channels. The wavelengths of the individual optical signals are 1546.12, 1547.72, 1549.32, 1550.92, 1552.52, 1554.13, 1555.75, and 1557.36 nm. The deviation between a minimum optical power and a maximum optical power is 1.16 dB. Accordingly, the gain tilt in a band of 1546 to 1557 nm is about 0.1 dB/nm. The minimum optical power is provided by the shortest wavelength, and the maximum optical power is provided by the longest wavelength. The gain tilt is substantially linear (the gain is indicated in dB).

The AGC circuit 34 shown in FIG. 12 controls the power of the pump light to be output from the pump light source 20 so that the gain tilt as shown in FIG. 13, for example, is maintained. Accordingly, the wavelength dependence of gain can be stably suppressed by adopting the AGC circuit 34 in spite of the fact that the optical filter 66' for suppressing the wavelength dependence of gain has fixed characteristics. More specifically, the optical filter 66' has a loss tilt such that the loss tilt suppresses (preferably cancels) the gain tilt described with reference to FIG. 13.

Figure 14:
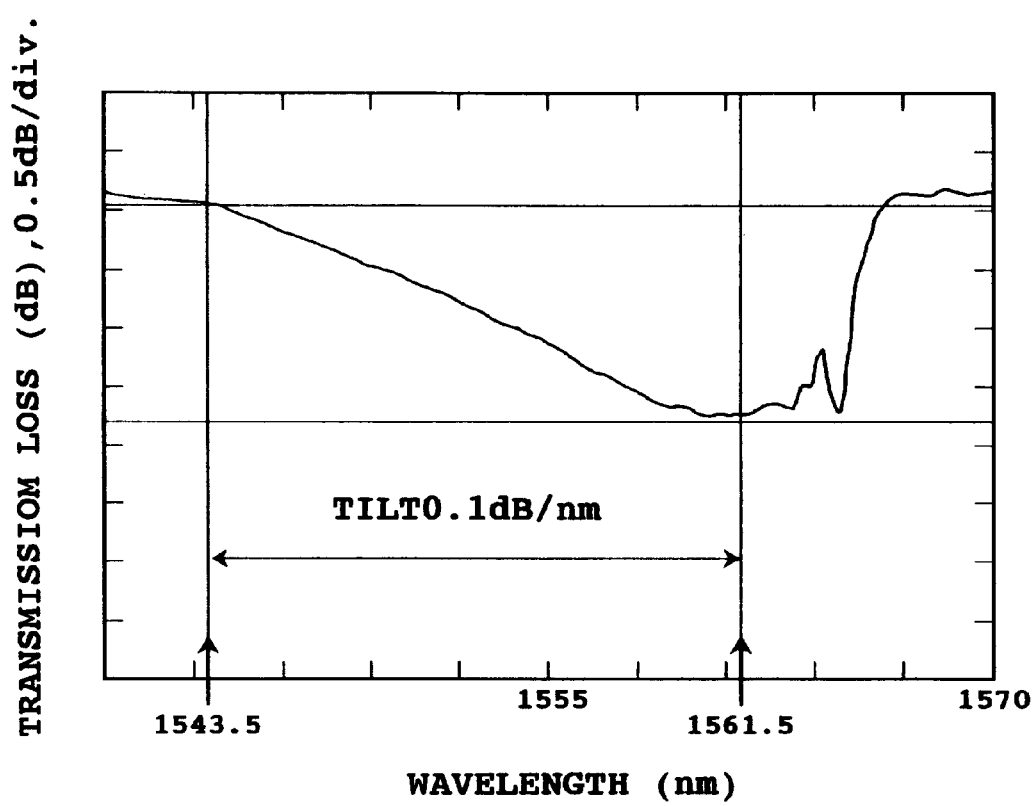
FIG. 14 is a graph showing the characteristics of an optical filter 66' shown in FIG. 12.

Referring to FIG. 14, there is shown an example of the characteristics of the optical filter 66'. In FIG. 14, the vertical axis represents transmission loss (dB), and the horizontal axis represents wavelength (nm). The optical filter 66' has characteristics such that the loss increases with an increase in wavelength in a band of about 1.54 μm to about 1.56 μm, and the loss tilt is about 0.1 dB/nm. Accordingly, the gain tilt of the optical amplifier 8' can be canceled by the loss tilt of the optical filter 66'.

In the preferred embodiment shown in FIG. 12, each of the rejection filter 68 and the optical filter 66' may be provided by a fiber grating.

Figure 15:
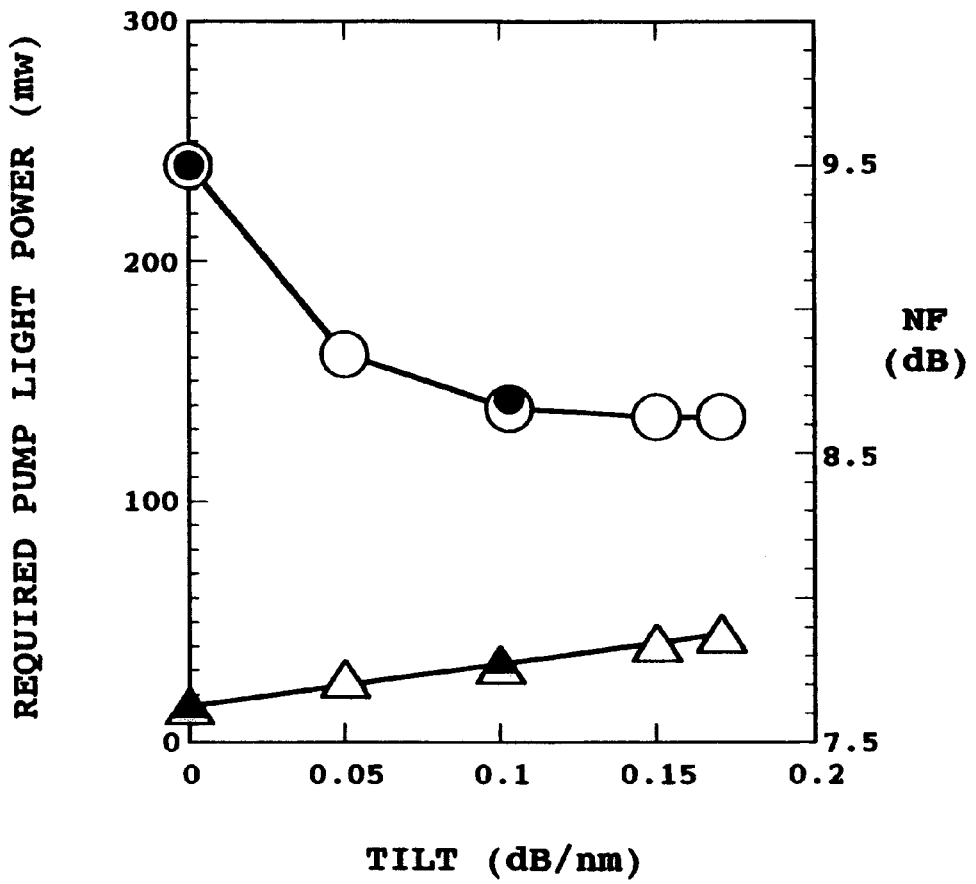
FIG. 15 is a graph showing the relation between required pump light power, noise figure, and tilt in the case that an optical filter is provided on the output side.

FIG. 15 is a graph showing the relation between required pump light power, noise figure (NF), and tilt (loss tilt) of an optical filter in the second basic configuration of the present invention in the case that the optical filter is provided on the output side, that is, in the case that the optical filter 66' is used. In FIG. 15, the vertical axes represent required pump light power (mW) and noise figure (dB), and the horizontal axis represents tilt (dB/nm). The required pump light power herein means a pump light power required to eliminate a gain tilt in the whole of the device.

Data giving the graph shown in FIG. 15 were obtained by an experiment and simulation using the configuration in accordance with the preferred embodiment shown in FIG.

12. For the calculations in the simulation, an analysis model and analysis method referring to C. R. Gailes, E. Desurvire, "Modeling Erbium-Doped Fiber Amplifiers", JOURNAL OF LIGHTWAVE TECHNOLOGY, Vol. 9, No. 2, 1991 were used. The calculations were made on pump light power required to flatten the gain between the shortest wavelength and the longest wavelength and noise figure corresponding to the required pump light power under the condition that the length of the EDF for obtaining a given output value (+6.0 dBm/ch) had been optimized.

In FIG. 15, a zero tilt corresponds to the case where the optical filter 66' was not used. In this case, the required pump light power was about 250 mW. In contrast, it was confirmed that the required pump light power in the rear stage as a power amplifying portion was reduced 40% or more by using the optical filter 66' having a tilt of 0.05 to 0.2 dB/nm. If the tilt is too small, the effect of reducing the required pump light power is small, whereas if the tilt is too large, the noise figure is high or the required length of the EDF is large. Therefore, the tilt is preferably in the range of 0.05 to 0.1 dB/nm.

Consequently, by pumping the EDF with a relatively low pump light power so as to produce a gain tilt such that the gain increases with an increase in wavelength and by using the optical filter providing a loss tilt such that the loss increases with an increase in wavelength wherein the loss tilt is suitably set, the wavelength dependence of gain can be suppressed without a degradation in noise figure.

Figure 16:
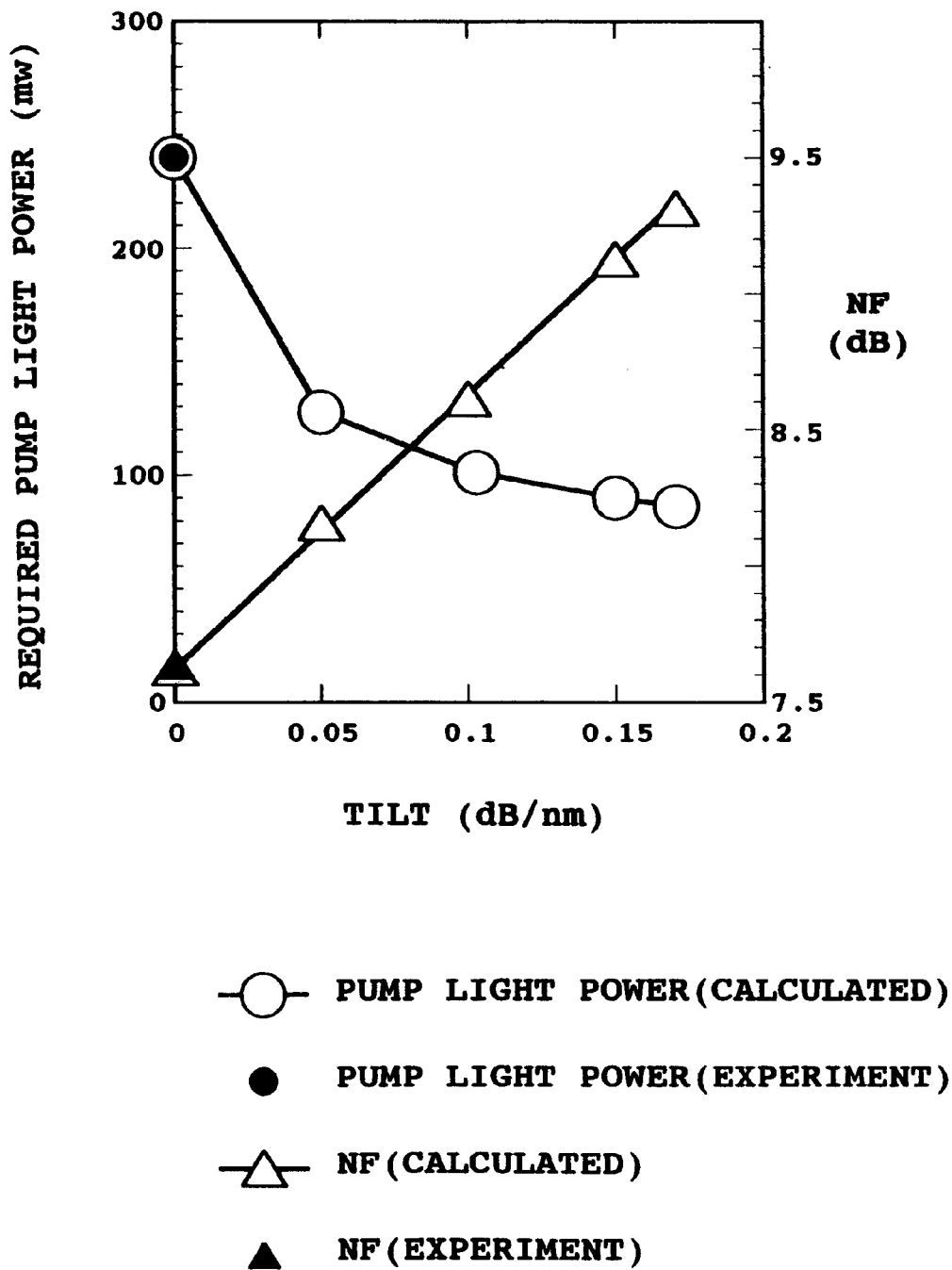
FIG. 16 is a graph showing the relation between required pump light power, noise figure, and tilt in the case that an optical filter is provided on the input side.

FIG. 16 shows the relation between required pump light power, noise figure, and tilt (loss tilt) of an optical filter in the second basic configuration of the present invention in the case that the optical filter is provided on the input side, that is, in the case that the optical filter 66 is used. As compared with FIG. 15, the required pump light power reduction effect (pump efficiency improvement effect) is larger, but the degradation in noise figure is larger. The tilt is preferably in the range of 0.05 to 0.1 dB/nm for the reason similar to that mentioned with reference to FIG. 15.

Accordingly, in embodying the second basic configuration of the present invention, when emphasis is put on the required pump light power reduction effect, the optical filter 66 is preferably provided on the input side of the optical amplifier 8', whereas when emphasis is put on the noise characteristics, the optical filter 66' is preferably provided on the output side of the optical amplifier 8'.

In embodying the present invention, a fiber grating is suitably used as each optical filter. By using the fiber grating, many of the above-mentioned requirements (a) to (f) can be satisfied.

In the case that the refractive index of an optical medium (e.g., glass) is permanently changed by light irradiation, the medium is called photosensitive. By using this property, a fiber grating can be prepared in the core of an optical fiber. The characteristic of a fiber grating is that it Bragg-reflects light in a band near a resonance wavelength determined by a grating pitch and an effective refractive index of a fiber mode. A fiber grating can be prepared by irradiating an optical fiber with excimer laser oscillating at 248 nm or 193 nm by use of a phase mask, for example.

For example, the characteristics shown in FIG. 8A or 8B can be obtained by applying a chirp method to prepare a fiber grating. In the chirp method, a grating pitch is set according to a suitable distribution, thereby obtaining desired characteristics. Actually, it has been verified that the fiber grating according to FIG. 8B can provide characteristics as designed in a band of 1528 to 1562 nm.

To verify that the temperature characteristics of the fiber grating are good, an experiment was made on the rejection filter 68 and the optical filter 66' (66) shown in FIG. 12. Each fiber grating subjected to the experiment was allowed to stand for a long period of time in the environments at 23.3° C., 91.2° C., and −5.4° C. in this order, and measurements were made on various items. Regarding the rejection filter, a change in wavelength showing a minimum output in the rejection band was 1.19 (nm), and regarding the optical filter 66' (66), almost no change in tilt and insertion loss was observed.

A fiber grating can be spliced directly to an optical fiber for constructing an optical circuit, and a splice loss is about 0.1 dB. Therefore, the insertion loss by the fiber grating is low.

The polarization dependence of the fiber grating and the temperature dependence of polarization dependence of the fiber grating were measured by using a light source and a polarization controller. As a result, these dependences were hardly observed.

In the case that the bandwidth of an optical signal is 30 nm and the substantially grating length of the fiber grating is 30 mm, an optical delay is estimated to be 4.8 ps/nm. Accordingly, it can be said that chromatic dispersion by the fiber grating is sufficiently small in practical use. However, if this delay is accumulated in high-speed transmission, there is a possibility that the accumulated delay may exceed a tolerance. Means for eliminating this possibility will be hereinafter described.

In the case that the fiber grating is prepared by a chirp method, reflected light is coupled to a fiber guided mode because of the fact that each grating is perpendicular to the fiber axis. As a result, in the case that a plurality of fiber gratings are cascaded to obtain desired characteristics, there is a possibility that characteristics as designed cannot be obtained by the effect of the reflected light. Further, even if characteristics as designed can be obtained by a single fiber grating, there is a possibility that desired gain characteristics cannot be obtained because reflected light is returned to an optical amplifying medium optically connected to the fiber grating. To eliminate such a possibility, the use of an optical isolator is effective. However, the use of an optical isolator causes complication and size enlargement of the device configuration.

By applying a blazed method or a long-period method to obtain a fiber grating, the reflected light can be effectively removed. In the blazed method, each grating is inclined to the fiber axis, thereby expelling the reflected light out of the fiber. In the long-period method, a grating pitch is set to a relatively large value, thereby removing the reflected light.

Additional details of the chirp method, the blazed method, and the long-period method is described in Yu Liu et al., "Analysis of Long-period and Short-period Fiber Bragg Gratings by Phase Matching Condition", SPIE, Vol. 2893, pp441–447 and P. StJ. Russel et al., "Fiber Gratings", Physics World, October, 1993, pp41–46.

Figure 17:
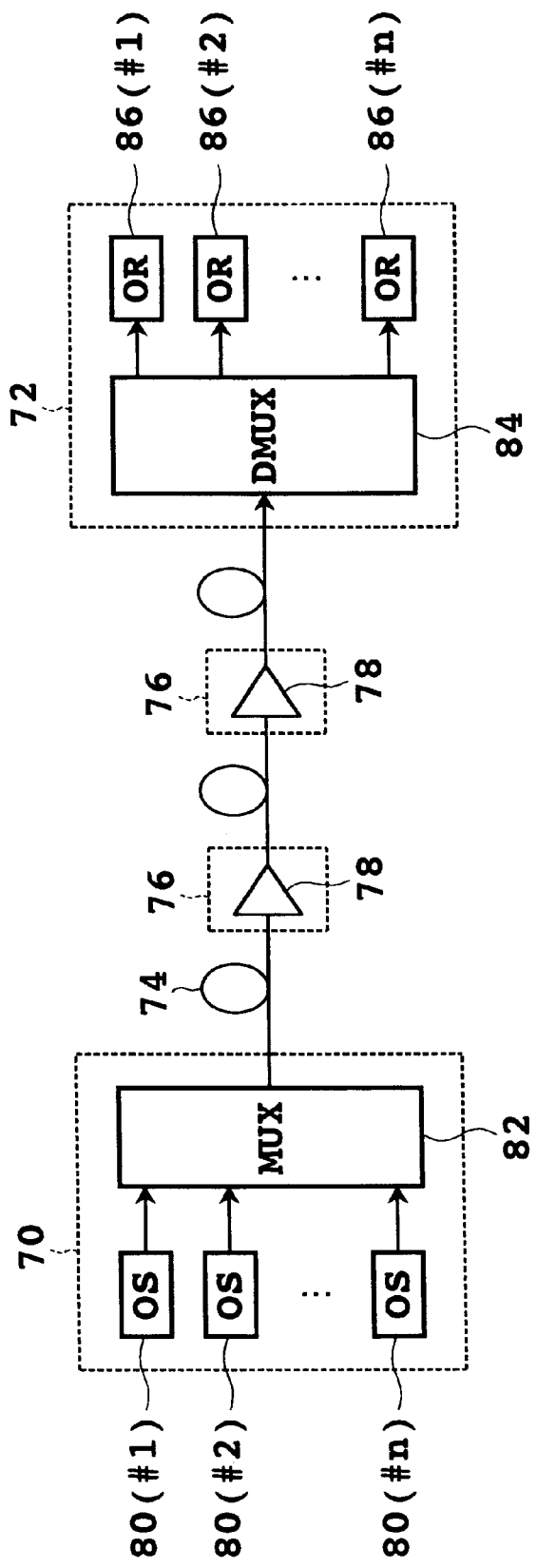
FIG. 17 is a block diagram showing a preferred embodiment of the system according to the present invention.

FIG. 17 is a block diagram showing a preferred embodiment of the optical fiber communication system according to the present invention. This system includes a first terminal station 70, a second terminal station 72, an optical fiber transmission line 74 connecting the terminal stations 70 and 72, and a plurality of (two in this preferred embodiment) optical repeaters 76 provided in the optical fiber transmission line 74. Each optical repeater 76 includes a device 78 according to the first or second basic configuration of the present invention. A single optical repeater 76 may be used instead. The first terminal station 70 includes a plurality of optical senders (OS) 80 (#1 to #n) for respectively outputting a plurality of optical signals having different wavelengths, and an optical multiplexer (MUX) 82 for wavelength division multiplexing the plural optical signals to obtain WDM optical signals and output them to the optical fiber transmission line 74. The second terminal station 72 includes an optical demultiplexer (DMUX) 84 for separating the WDM optical signals transmitted by the optical fiber transmission line 74 into a plurality of optical signals, and a plurality of optical receivers 86 (#1 to #n) for respectively receiving the plural optical signals.

With this configuration, losses of the WDM optical signals can be compensated by the optical repeater or repeaters 76 provided in the optical fiber transmission line 74, thereby allowing long-haul transmission. To obtain this effect, the first terminal station 70 may have an optical amplifier as a booster amplifier (postamplifier), and the second terminal station 72 may have an optical amplifier as a preamplifier. Particularly, since each optical repeater 76 has the device 78 according to the present invention, the wavelength dependence of gain in each optical repeater 76 can be suppressed and the limit of a transmission distance due to a gain deviation can be reduced. In the case that the second basic configuration of the present invention is applied to each device 78, the wavelength dependence of gain can be suppressed under the condition of low pump light power in each device 78, thereby allowing the construction of a high-reliability and low-cost system.

In the case of using a fiber grating as each optical filter used in embodying the present invention as described above, a delay of about 4.8 ps/nm occurs in each fiber grating. In the case that the first basic configuration of the present invention is applied to each device 78 in the system shown in FIG. 17, and that the number of the devices 78 is nine, for example, a total dispersion becomes 86.4 ps/nm (=4.8 ps/nm×2×9) because each device 78 includes two optical filters. In a system to which an external modulation of 10 Gbit/s is applied, a limit of chromatic dispersion is about 750 ps/km/nm. In this case, the above dispersion of 86.4 ps/nm becomes about 12% of the above limit and exceeds a tolerance.

The first basic configuration of the present invention is effective in reducing or ideally zeroing the dispersion in each device 78 or managing the overall chromatic dispersion in the system shown in FIG. 17. This will now be discussed more specifically.

Figure 18A:
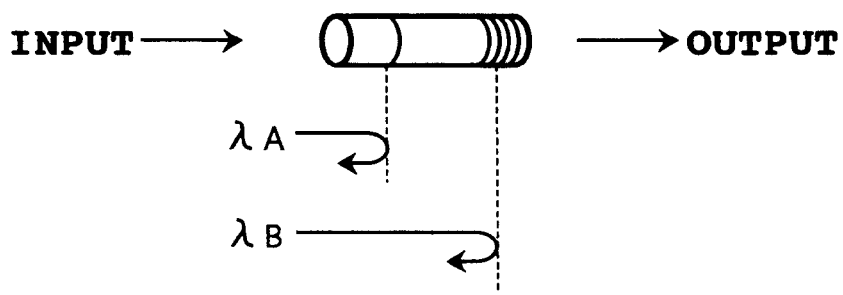
FIGS. 18A and 18B are schematic views for illustrating the difference in sign of a chromatic dispersion according to the direction of insertion of a fiber grating.
Figure 18B:
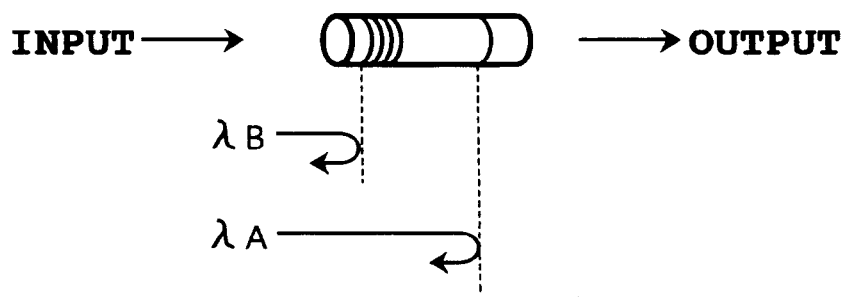

In the case of using a fiber grating as each optical filter, the sign (positive or negative) of chromatic dispersion can be selected according to the direction of insertion of the fiber grating as shown in FIGS. 18A and 18B. Assuming that light having different wavelengths λA and λB is supplied to the fiber grating and that a positive chromatic dispersion is obtained in FIG. 18A, a negative chromatic dispersion can be given by the fiber grating by reversing the direction of insertion of the fiber grating as shown in FIG. 18B because of difference in Bragg reflection position.

Accordingly, in the case that the first basic configuration of the present invention is applied to each device 78 shown in FIG. 17, the chromatic dispersion in each device 78 can be reduced by setting the sign of a first chromatic dispersion given by the first optical filter 6 shown in FIG. 1 and the sign of a second chromatic dispersion given by the second optical filter 10 shown in FIG. 1 different from each other. In particular, by making the absolute values of the first and second chromatic dispersions substantially equal to each other, the chromatic dispersion in each fiber grating can be canceled to thereby make the chromatic dispersion in each device 78 substantially zero. Accordingly, in a system already adopting a management method for managing the chromatic dispersion in the optical fiber transmission line 74 between the terminal stations 70 and 72 to thereby prevent a degradation in transmission characteristics due to the chromatic dispersion, the existing management method for chromatic dispersion can be applied without modification by setting the chromatic dispersion in each device 78 to substantially zero.

The management of chromatic dispersion herein means setting the total chromatic dispersion between the terminal stations 70 and 72 to a predetermined value or within a predetermined range.

In the case that the management of chromatic dispersion in the optical fiber transmission line 74 between the terminal stations 70 and 72 is insufficient, the management of chromatic dispersion may be performed by setting the signs of the first and second chromatic dispersions equal to each other and positively canceling the chromatic dispersion in the optical fiber transmission line 74 by the chromatic dispersion in each device 78 (the sum of the first and second chromatic dispersions). For example, in a plurality of spans of the optical fiber transmission line 74, the signs of chromatic dispersions in the plural spans become different from each other because of variations in optical fiber manufacturing technique and fluctuations in optical signal wavelength. As a result, in the case that the sign of the total chromatic dispersion in the optical fiber transmission line 74 is positive, the sign of the chromatic dispersion in each device 78 is set to be negative.

To prevent waveform deterioration due to a nonlinear effect in a fiber such as self phase modulation (SPM), a predetermined chromatic dispersion is sometimes set locally or generally between the terminal stations 70 and 72. Also in such a case, a desired value of chromatic dispersion can be set in each device 78.

As described above, according to the present invention, it is possible to provide a method, device, or system which can obtain a low noise figure and high optical output power and can suppress the wavelength dependence of gain. Further, according to the present invention, it is also possible to provide a method, device, or system which can suppress the wavelength dependence of gain under the condition of low pumping power (e.g., low pump light power) for an optical amplifying medium.

What is claimed is:

1. A device comprising:

an optical amplifier comprising an optical amplifying medium having an input end and an output end for an optical signal, and means for pumping said optical amplifying medium so that said optical amplifying medium provides a gain band including a first band giving a relatively high gain and noise figure to said optical signal and a second band giving a relatively low gain and noise figure;

a first optical filter optically connected to said input end of said optical amplifying medium and having characteristics such that said first optical filter suppresses wavelength dependence of gain in said second band; and a second optical filter optically connected to said output end of said optical amplifying medium and having characteristics such that said second optical filter suppresses wavelength dependence of gain in said first band.

2. A device according to claim 1, wherein:

said optical amplifying medium comprises a doped fiber doped with a dopant including a rare earth element; and said pumping means comprises a pump light source for outputting pump light and an optical coupler for supplying said pump light to said optical amplifying medium from at least one of said input end and said output end.

3. A device according to claim 2, wherein:
said dopant includes Er (erbium);
said first band is provided by wavelengths of 1.52 to 1.54 μm; and
said second band is provided by wavelengths of 1.54 to 1.58 μm.

4. A device according to claim 3, wherein said pump light has a wavelength included in at least one of a 0.98 μm band and a 1.48 μm band.

5. A device according to claim 2, further comprising means for controlling power of said pump light so that gain characteristics given by said optical amplifying medium are maintained constant.

6. A device according to claim 5, wherein said controlling means comprises means for detecting an input level and an output level of said optical amplifier and means for adjusting the power of said pump light so that the ratio between said input level and said output level becomes constant.

7. A device according to claim 1, further comprising a second optical amplifier provided upstream of said first optical filter in terms of a propagation direction of said optical signal.

8. A device according to claim 7, wherein:
said optical amplifying medium comprises a first doped fiber doped with a first dopant including a rare earth element;
said pumping means comprises a first pump light source for supplying first pump light having a first wavelength to said first doped fiber; and
said second optical amplifier comprises a second doped fiber doped with a second dopant including a rare earth element, and a second pump light source for supplying second pump light having a second wavelength to said second doped fiber.

9. A device according to claim 8, wherein:
each of said first and second dopants includes Er (erbium);
said first band is provided by wavelengths of 1.52 to 1.54 μm; and
said second band is provided by wavelengths of 1.54 to 1.58 μm.

10. A device according to claim 9, wherein:
said first wavelength is included in a 1.48 μm band; and
said second wavelength is included in a 0.98 μm band.

11. A device according to claim 8, further comprising:
means for controlling power of said first pump light according to an input level and an output level of said optical amplifier so that gain characteristics given by said first doped fiber are maintained constant; and
means for controlling power of said second pump light according to an input level and an output level of said second optical amplifier so that gain characteristics given by said second doped fiber are maintained constant.

12. A device according to claim 7, further comprising:
a variable optical attenuator operatively connected between said second optical amplifier and said optical amplifier;
means for detecting an output level of said optical amplifier; and
means for controlling attenuation by said variable optical attenuator so that the output level of said optical amplifier is maintained constant.

13. A device according to claim 1, wherein each of said first and second optical filters comprises a fiber grating.

14. A device according to claim 1, wherein said first and second optical filters give first and second chromatic dispersions to said optical signal, respectively.

15. A device according to claim 14, wherein said first and second chromatic dispersions have different signs.

16. A device according to claim 14, wherein said first and second chromatic dispersions have the same sign.

17. A device according to claim 1, wherein said optical signal comprises WDM optical signals obtained by wavelength division multiplexing a plurality of optical signals having different wavelengths.

18. A method comprising the steps of:
(a) pumping an optical amplifying medium so that said optical amplifying medium provides a gain band including a first band giving a relatively high gain and noise figure to an optical signal and a second band giving a relatively low gain and noise figure to said optical signal;
(b) supplying to said optical amplifying medium said optical signal passed through a first optical filter having characteristics such that said first optical filter suppresses wavelength dependence of gain in said second band; and
(c) supplying said optical signal output from said optical amplifying medium to a second optical filter having characteristics such that said second optical filter suppresses wavelength dependence of gain in said first band.

19. A method according to claim 18, wherein:
said optical amplifying medium comprises a doped fiber doped with a dopant including Er (erbium);
said first band is provided by wavelengths of 1.52 to 1.54 μm; and
said second band is provided by wavelengths of 1.54 to 1.58 μm.

20. A method according to claim 18, wherein said optical signal comprises WDM optical signals obtained by wavelength division multiplexing a plurality of optical signals having different wavelengths.

21. A device comprising:
an optical amplifying medium having an input end and an output end for an optical signal;
means for pumping said optical amplifying medium so that said optical amplifying medium has substantially simple gain characteristics in a predetermined band, said substantially simple gain characteristic producing a gain tilt such that gain increases with an increase in wavelength; and
an optical filter optically connected to at least one of said input end and said output end of said optical amplifying medium and having characteristics such that said optical filter suppresses wavelength dependence of gain in said predetermined band.

22. A device according to claim 21, wherein:
said optical amplifying medium comprises a doped fiber doped with a dopant including a rare earth element; and
said pumping means comprises a pump light source for outputting pump light and an optical coupler for supplying said pump light to said optical amplifying medium from at least one of said input end and said output end.

23. A device according to claim 22, wherein:
said dopant includes Er (erbium); and said predetermined band is provided by wavelengths of 1.54 to 1.56 µm.

24. A device according to claim 23, wherein said pump light has a wavelength included in at least one of a 0.98 µm band and a 1.48 µm band.

25. A device according to claim 23, wherein:
said characteristics of said optical filter give a loss tilt such that the loss increases with an increase in wavelength.

26. A device according to claim 25, wherein said loss tilt is in the range of 0.05 to 0.1 dB/nm.

27. A device according to claim 22, further comprising means for controlling power of said pump light so that said substantially simple gain characteristics are maintained constant.

28. A device according to claim 27, wherein said controlling means comprises means for detecting an input level and an output level of said device, and means for adjusting the power of said pump light so that the ratio between said input level and said output level becomes constant.

29. A device according to claim 21, wherein said optical filter comprises a fiber grating.

30. A device according to claim 21, wherein said optical signal comprises WDM optical signals obtained by wavelength division multiplexing a plurality of optical signals having different wavelengths.

31. A device comprising:
a doped fiber doped with a dopant including Er (erbium);
means for pumping said doped fiber so that said doped fiber has a gain tilt such that the gain increases with an increase in wavelength in a predetermined band; and
an optical filter operatively connected to said doped fiber and having a loss tilt such that said optical filter suppresses said gain tilt.

32. A device according to claim 31, wherein said predetermined band is provided by wavelengths of 1.54 to 1.56 µm.

33. A system comprising:
first and second terminal stations;
an optical fiber transmission line connecting said first and second terminal stations; and
at least one optical repeater provided in said optical fiber transmission line;
said first terminal station comprising a plurality of optical senders for respectively outputting a plurality of optical signals having different wavelengths, and an optical multiplexer for wavelength division multiplexing said plurality of optical signals to obtain WDM optical signals and outputting said WDM optical signals to said optical fiber transmission line;
said second terminal station comprising an optical demultiplexer for separating said WDM optical signals transmitted by said optical fiber transmission line into a plurality of optical signals, and a plurality of optical receivers for respectively receiving said plurality of optical signals;
said optical repeater comprising an optical amplifier comprising an optical amplifying medium having an input end and an output end for an optical signal, and means for pumping said optical amplifying medium so that said optical amplifying medium provides a gain band including a first band giving a relatively high gain and noise figure to said optical signal and a second band giving a relatively low gain and noise figure; a first optical filter optically connected to said input end of said optical amplifying medium and having characteristics such that said first optical filter suppresses wavelength dependence of gain in said second band; and a second optical filter optically connected to said output end of said optical amplifying medium and having characteristics such that said second optical filter suppresses wavelength dependence of gain in said first band.

34. A system comprising:
first and second terminal stations;
an optical fiber transmission line connecting said first and second terminal stations; and
at least one optical repeater provided in said optical fiber transmission line;
said first terminal station comprising a plurality of optical senders for respectively outputting a plurality of optical signals having different wavelengths, and an optical multiplexer for wavelength division multiplexing said plurality of optical signals to obtain WDM optical signals and outputting said WDM optical signals to said optical fiber transmission line;
said second terminal station comprising an optical demultiplexer for separating said WDM optical signals transmitted by said optical fiber transmission line into a plurality of optical signals, and a plurality of optical receivers for respectively receiving said plurality of optical signals;
said optical repeater comprising an optical amplifying medium having an input end and an output end for an optical signal; means for pumping said optical amplifying medium so that said optical amplifying medium has substantially simple gain characteristics in a predetermined band, said substantially simple gain characteristics give a gain tilt such that the gain increases with an increase in wavelength; and an optical filter optically connected to at least one of said input end and said output end of said optical amplifying medium and having characteristics such that said optical filter suppresses wavelength dependence of gain in said predetermined band.

35. A system comprising:
first and second terminal stations;
an optical fiber transmission line connecting said first and second terminal stations; and
at least one optical repeater provided in said optical fiber transmission line;
said first terminal station comprising a plurality of optical senders for respectively outputting a plurality of optical signals having different wavelengths, and an optical multiplexer for wavelength division multiplexing said plurality of optical signals to obtain WDM optical signals and outputting said WDM optical signals to said optical fiber transmission line;
said second terminal station comprising an optical demultiplexer for separating said WDM optical signals transmitted by said optical fiber transmission line into a plurality of optical signals, and a plurality of optical receivers for respectively receiving said plurality of optical signals;
said optical repeater comprising a doped fiber doped with a dopant including Er (erbium); means for pumping said doped fiber so that said doped fiber has a gain tilt such that the gain increases with an increase in wavelength in a predetermined band; and an optical filter operatively connected to said doped fiber and having a loss tilt such that said optical filter suppresses said gain tilt.

36. A device comprising:

an optical amplifier comprising an optical amplifying medium having an input end and an output end for an optical signal, and said optical amplifying medium being pumped so that said optical amplifying medium provides a gain band including a first band giving a relatively high gain and noise figure to said optical signal and a second band giving a relatively low gain and noise figure;

a first optical filter optically connected to said input end of said optical amplifying medium and having characteristics such that said first optical filter suppresses wavelength dependence of gain in said second band; and a second optical filter optically connected to said output end of said optical amplifying medium and having characteristics such that said second optical filter suppresses wavelength dependence of gain in said first band.

37. A device comprising:

an optical amplifying medium having an input end and an output end for an optical signal;

a pumping unit pumping said optical amplifying medium so that said optical amplifying medium has substantially simple gain characteristics in a predetermined band, said substantially simple gain characteristic producing a gain tilt such that gain increases with an increase in wavelength; and an optical filter optically connected to at least one of said input end and said output end of said optical amplifying medium and having characteristics such that said optical filter suppresses wavelength dependence of gain in said predetermined band.

38. A device comprising:

a doped fiber doped with a dopant including Er (erbium);

a pumping unit to pump said doped fiber so that said doped fiber has a gain tilt such that the gain increases with an increase in wavelength in a predetermined band; and an optical filter operatively connected to said doped fiber and having a loss tilt such that said optical filter suppresses said gain tilt.

39. A system comprising:

first and second terminal stations;

an optical fiber transmission line connecting said first and second terminal stations; and at least one optical repeater provided in said optical fiber transmission line;

said first terminal station comprising a plurality of optical senders for respectively outputting a plurality of optical signals having different wavelengths, and an optical multiplexer for wavelength division multiplexing said plurality of optical signals to obtain WDM optical signals and outputting said WDM optical signals to said optical fiber transmission line;

said second terminal station comprising an optical demultiplexer for separating said WDM optical signals transmitted by said optical fiber transmission line into a plurality of optical signals, and a plurality of optical receivers for respectively receiving said plurality of optical signals;

said optical repeater comprising an optical amplifier comprising an optical amplifying medium having an input end and an output end for an optical signal, and a pumping unit pumping said optical amplifying medium so that said optical amplifying medium provides a gain band including a first band giving a relatively high gain and noise figure to said optical signal and a second band giving a relatively low gain and noise figure; a first optical filter optically connected to said input end of said optical amplifying medium and having characteristics such that said first optical filter suppresses wavelength dependence of gain in said second band; and a second optical filter optically connected to said output end of said optical amplifying medium and having characteristics such that said second optical filter suppresses wavelength dependence of gain in said first band.

40. A system comprising:

first and second terminal stations;

an optical fiber transmission line connecting said first and second terminal stations; and at least one optical repeater provided in said optical fiber transmission line;

said first terminal station comprising a plurality of optical senders for respectively outputting a plurality of optical signals having different wavelengths, and an optical multiplexer for wavelength division multiplexing said plurality of optical signals to obtain WDM optical signals and outputting said WDM optical signals to said optical fiber transmission line;

said second terminal station comprising an optical demultiplexer for separating said WDM optical signals transmitted by said optical fiber transmission line into a plurality of optical signals, and a plurality of optical receivers for respectively receiving said plurality of optical signals;

said optical repeater comprising an optical amplifying medium having an input end and an output end for an optical signal; a pumping unit pumping said optical amplifying medium so that said optical amplifying medium has substantially simple gain characteristics in a predetermined band, said substantially simple gain characteristics give a gain tilt such that the gain increases with an increase in wavelength; and an optical filter optically connected to at least one of said input end and said output end of said optical amplifying medium and having characteristics such that said optical filter suppresses wavelength dependence of gain in said predetermined band.

41. A system comprising:

first and second terminal stations;

an optical fiber transmission line connecting said first and second terminal stations; and at least one optical repeater provided in said optical fiber transmission line;

said first terminal station comprising a plurality of optical senders for respectively outputting a plurality of optical signals having different wavelengths, and an optical multiplexer for wavelength division multiplexing said plurality of optical signals to obtain WDM optical signals and outputting said WDM optical signals to said optical fiber transmission line;

said second terminal station comprising an optical demultiplexer for separating said WDM optical signals transmitted by said optical fiber transmission line into a plurality of optical signals, and a plurality of optical receivers for respectively receiving said plurality of optical signals;

said optical repeater comprising a doped fiber doped with a dopant including Er (erbium); means for pumping said doped fiber so that said doped fiber has a gain tilt such that the gain increases with an increase in wavelength in a predetermined band; and an optical filter operatively connected to said doped fiber and having a loss tilt such that said optical filter suppresses said gain tilt.

* * * * *